United States Patent
Bottomley et al.

(10) Patent No.: US 7,397,842 B2
(45) Date of Patent: Jul. 8, 2008

(54) METHOD AND APPARATUS FOR COMBINING WEIGHT COMPUTATION IN A DS-CDMA RAKE RECEIVER

(75) Inventors: Gregory E. Bottomley, Cary, NC (US); Carmela Cozzo, Cary, NC (US); Ali S. Khayrallah, Cary, NC (US); Dignus-Jan Moelker, Amsterdam (NL)

(73) Assignee: Telefonaktiebolaget LM Ericsson (publ) (SE)

( * ) Notice: Subject to any disclaimer, the term of this patent is extended or adjusted under 35 U.S.C. 154(b) by 1194 days.

(21) Appl. No.: 10/672,127

(22) Filed: Sep. 26, 2003

(65) Prior Publication Data

US 2005/0069023 A1    Mar. 31, 2005

(51) Int. Cl.
*H04B 1/00* (2006.01)
(52) U.S. Cl. .................. 375/148; 375/130; 375/134; 375/136; 375/137; 375/142; 375/143; 375/144; 375/147; 375/150; 375/152; 375/346
(58) Field of Classification Search .............. 375/130, 375/134, 136–137, 142–144, 150, 152, 346
See application file for complete search history.

(56) References Cited

U.S. PATENT DOCUMENTS

| | | | |
|---|---|---|---|
| 6,363,104 B1 | 3/2002 | Bottomley | |
| 6,801,565 B1 * | 10/2004 | Bottomley et al. | .......... 375/148 |
| 2002/0150176 A1 | 10/2002 | Chevalier et al. | |

FOREIGN PATENT DOCUMENTS

WO    WO 00/70836    11/2000

OTHER PUBLICATIONS

F. Ling; Optimal Reception, Performance Bound, and Cutoff Rate Analysis of Reference Assisted Coherent CDMA Communications with Applications; IEEE Trans. Commun., vol. 47; pp. 1583-1592, Oct. 1999.

K. Kettunen; Enhanced Maximal Ratio Combining Scheme for RAKE Receivers In WCDMA Mobile Terminals; electronic letters; vol. 37, No. 8; pp. 522-524; Apr. 12, 2001.

J. Choi; Pilot Channel-Aided Techniques to Compute the Beamforming Vector for CDMA Systems with Antenna Array; IEEE Trans. Veh. Technol.; vol. 49, pp. 1760-1775, Sep. 2000.

(Continued)

*Primary Examiner*—Curtis B. Odom
(74) *Attorney, Agent, or Firm*—Coats & Bennett, P.L.L.C.

(57) ABSTRACT

A RAKE receiver circuit generates combining weights based on channel estimates and combining statistics that comprise channel coefficient statistics, noise statistics, and channel estimation error statistics. Together, these statistics incorporate the relationships in noise and channel estimation across two or more RAKE fingers, and thus improve combining weight generation. Exemplary determination of statistics comprises channel coefficient cross-correlations, noise cross-correlations, and channel estimation error cross-correlations. Determination of the statistics can be varied based on, for example, the assumption of default or nominal signal models. Further, statistics determination can be configured for different receive and transmit diversity scenarios, wherein combining statistics can be determined on a per diversity signal basis, or jointly for two or more diversity signals, or in a mixed separate/joint method wherein one or more statistics are determined on a per signal basis and one or more statistics are determined across the signals.

91 Claims, 6 Drawing Sheets

OTHER PUBLICATIONS

J.C. Guey, M.P. Fitz, M.R. Bell, and W.Y. Kuo; Signal Design for Transmitter Diversity Wireless Communication Systems over Rayleigh Fading Channels; IEEE Trans. Commun.; vol. 47; pp. 527-537; Apr. 1999.

W.Y. Kuo and M.P. Fitz; Design and Analysis of Transmitter Diversity Using International Frequency Offset for Wireless Communications; IEEE Trans. Veh. Technol.; vol. 46; pp. 871-881; Nov. 1997.

G.E. Bottomley, T. Ottosson, and Y.P.E. Wang; A Generalized RAKE Receiver for Interference Suppression; IEEE J. Sel. Areas Commun.; vol. 18; pp. 1536-1545 Aug. 2000.

R. Price and P.E. Green, Jr.; A Communication Technique For Multipath Channels; Proc. IRE, vol. 46; pp. 555-570; Mar. 1958.

G.L. Turin; Introduction to Antimultipath Techniques and Their Application to Urban Digital Radio; Proc. IEEE, vol. 68; pp. 328-353; Mar. 1980.

G.E. Bottomley, E. Sourour, R. Ramesh, and S. Chennakeshu; Optimizing the Performance of Limited Complexity RAKE Receivers; Proc. 48th IEEE Veh. Technol. Conf.; Ottawa, Canada, May 18-21, 1998.

K.J. Kim, S.Y. Kwon, E.K. Hong, and K.C. Whang; Effect of Tap Spacing on the Performance of Direct-Sequence Spread-Spectrum RAKE Receiver; IEEE Trans Commun.; vol. 48; pp. 1029-1036; Jun. 2000.

Lenardi, et al.; A RAKE Structured SINR Maximizing Mobile Receiver for the WCDMA Downlink; 2001 IEEE; 6 pgs.

Lindoff, et al.; Channel Estimation for the W-CDMA System, Performance and Robustness Analysis from a Terminal Perspective; 1999 IEEE; 6 pgs.

D'Amours, et al.; Comparison of Pilot Symbol-Assisted and Differentially Detected BPSK for DS-CDMA Systems Employing RAKE Receivers in Rayleigh Fading Channels; IEEE Transactions on Vehicular Technology, vol. 47, No. 4, Nov. 1998; 10 pgs.

D'Andrea, et al.; Symbol-Aided Channel Estimation With Nonselective Rayleigh Fading Channels; IEEE Transactions on Vehicular Technology, vol. 44, No. 1; Feb. 1995; 9 pgs.

Rushforth, "Transmitted-Reference Techniques for Random or Unknown Channels," IEEE Trans. Info. Theory, vol. IT-10, pp. 39-42, Jan. 1964.

Walker, "The Error Performance of a Class of Binary Communications Systems in Fading and Noise," IEEE Trans. Commun. Syst., vol. 12, pp. 28-45, Mar. 1964.

Hingorani et al., "A Transmitted Reference System for Communication in Random or Unknown Channels," IEEE Trans. Commun. Technol. vol. 13, pp. 293-301, Sep. 1965.

Stojanovic et al., "Performance of Multiuser Detection with Adaptive Channel Estimation," IEEE Trans. Commun., vol. 47, pp. 1129-1132, Aug. 1999.

* cited by examiner

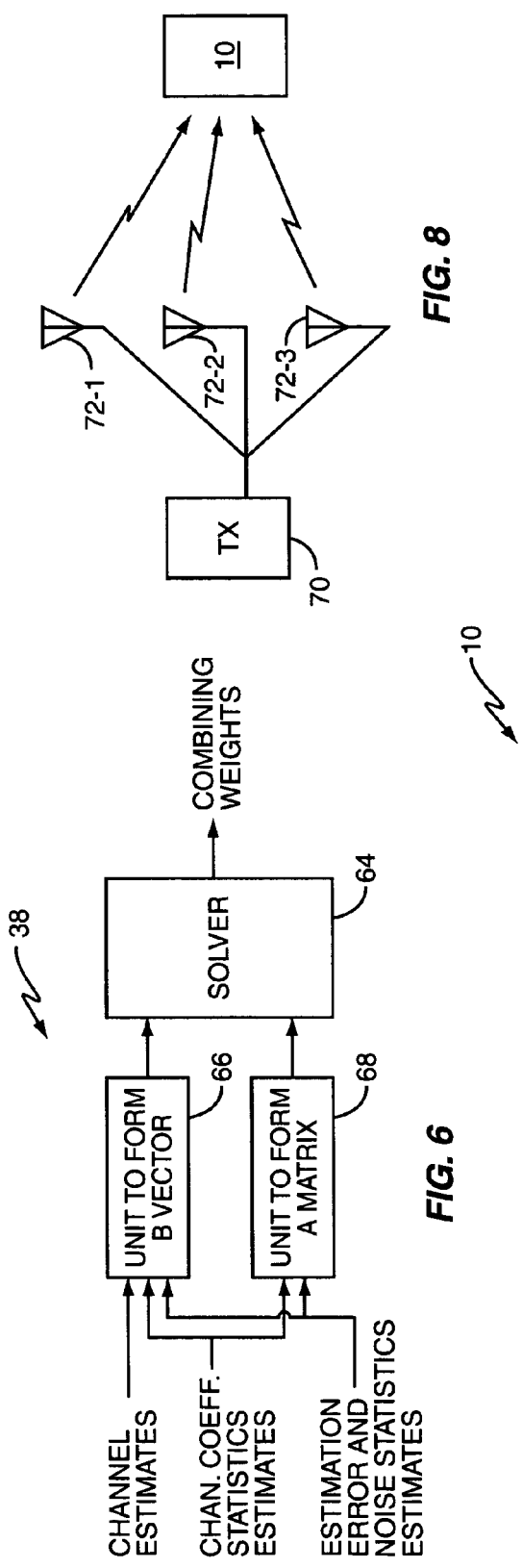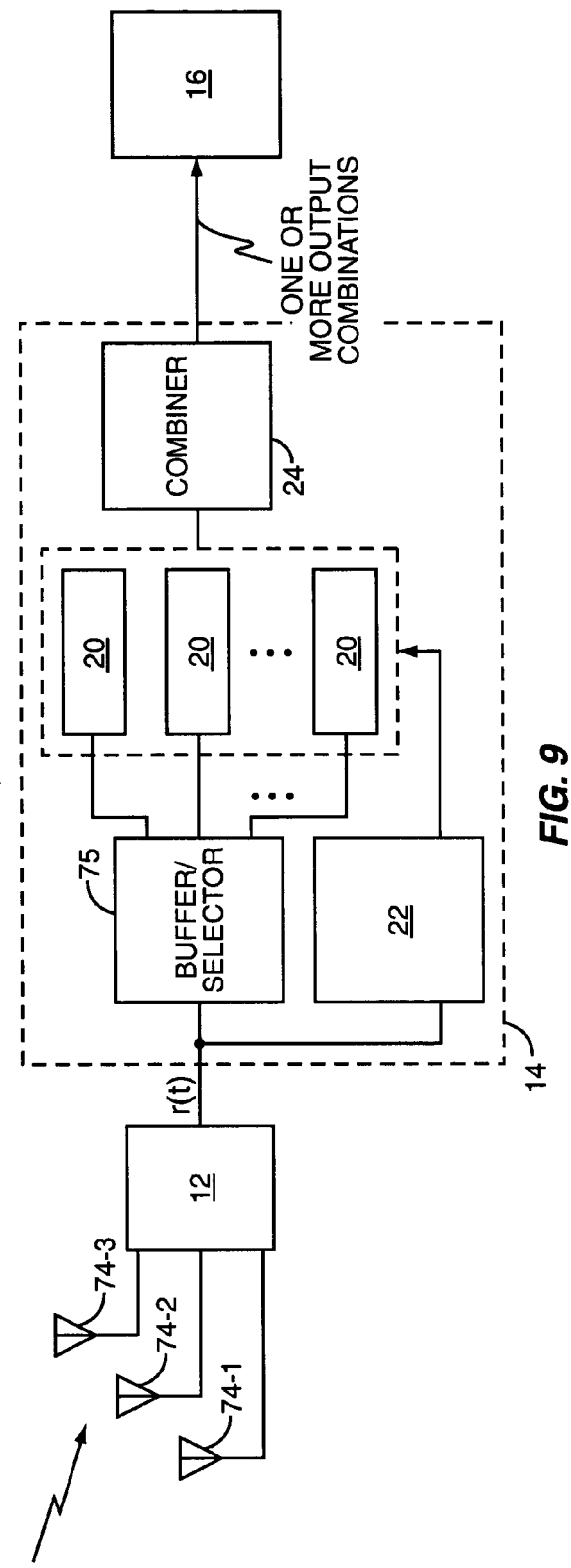

METHOD AND APPARATUS FOR COMBINING WEIGHT COMPUTATION IN A DS-CDMA RAKE RECEIVER

BACKGROUND OF THE INVENTION

The present invention generally relates to RAKE receivers and particularly relates to the computation of the RAKE "combining weights" used in such receivers.

RAKE receivers represent a well-known approach to multipath reception, particularly in Direct Sequence Code Division Multiple Access (DS-CDMA) wireless communication systems. With multipath, a transmitted signal follows multiple propagation paths and the intended receiver thus receives multiple "versions" (images) of the transmitted signal, with each signal image generally suffering from different path delay, phase, and attenuation effects.

RAKE receivers exploit multipath by allocating each of two or more RAKE "fingers" to one of the incoming signal images. In that sense, then, each finger is tuned to a particular one of the multipath components of the incoming composite received signal and each finger thus receives its own version of the originally transmitted signal. By estimating the channel effects, e.g., phase and attenuation, and by properly accounting for the differences in path delays, the individual output from each finger may be RAKE combined with the outputs from the other fingers to provide a combined RAKE output signal whose signal-to-noise ratio (SNR) generally is improved by the summed contribution of each finger's despread output signal.

SUMMARY OF THE INVENTION

The present invention comprises a method and apparatus to generate RAKE receiver combining weights based on generating combining statistics. In an exemplary embodiment of the present invention, a method of generating RAKE combining weights comprises obtaining individual finger output signals by despreading a received signal in each of two or more RAKE fingers, generating channel estimates corresponding to the RAKE fingers, determining combining statistics comprising channel coefficient statistics, channel estimation error statistics, and noise statistics for the RAKE fingers, and computing RAKE combining weights for combining the individual finger output signals from the RAKE fingers into a RAKE combined signal based on the channel estimates and the combining statistics.

Determining combining statistics can comprise determining channel coefficient statistics, channel estimation error statistics, and noise statistics for the RAKE fingers based on estimating correlations of channel coefficients across the RAKE fingers, and determining channel estimation error correlations and noise correlations across the RAKE fingers. Determining combining statistics further can comprise estimating means of the channel coefficients for the RAKE fingers, and determining an estimation error covariance and a noise covariance across the RAKE fingers.

An exemplary RAKE receiver circuit according to the present invention comprises a RAKE processor circuit configured to obtain individual finger output signals by despreading a received signal in each of two or more RAKE fingers, generate channel estimates corresponding to the RAKE fingers, determine combining statistics comprising channel coefficient statistics, channel estimation error statistics, and noise statistics for the RAKE fingers, and compute RAKE combining weights for combining the individual finger output signals from the RAKE fingers into a RAKE combined signal based on the channel estimates and the combining statistics. The RAKE processor circuit can comprise a channel coefficient estimator configured to estimate channel coefficients for the RAKE fingers, a channel coefficient statistic estimator configured to estimate channel coefficient statistics, and a noise and error statistic estimator configured to estimate noise and channel estimation error statistics.

Exemplary RAKE receiver circuits according to the present invention can be implemented in a range of communication devices including, but not limited to, mobile terminals and wireless base stations for use in wireless communication networks. Further, the present invention may be used in a variety of network types, with exemplary networks including, but not limited to, Wideband CDMA (WCDMA) networks, IS-2000 networks, IS-95B networks, and essentially any other communication network that uses, or that might use, RAKE receivers.

In any of these embodiments, the exemplary RAKE receiver circuit can be implemented in hardware, software, or both. As such, an exemplary RAKE processor circuit comprises one or more microprocessors, such as one or more digital signal processors that are configured to execute program instructions stored in a computer readable medium embodying the above described exemplary method of combining weight generation, or variations thereof. Other signal processing elements can be used, such as Application Specific Integrated Circuits (ASICs) or Field Programmable Gate Arrays (FPGAs).

An exemplary RAKE receiver circuit can be configured to store, or otherwise have access to, nominal channel coefficient cross-correlation data based on, for example, one or more default fading correlation values.

Those skilled in the art should appreciate that the present invention is not limited to these broadly described embodiments. Indeed, the many additional features and advantages of the present invention will become apparent upon reading the following detailed description in conjunction with viewing the various exemplary drawings.

BRIEF DESCRIPTION OF THE DRAWINGS

FIG. 6 is a diagram of an exemplary combining weight generator.

FIG. 8 is a diagram of an exemplary transmit diversity embodiment.

FIG. 9 is a diagram of an exemplary receive diversity embodiment.

DETAILED DESCRIPTION OF THE INVENTION

In discussing exemplary embodiments of the present invention in more detail, it should be understood from the outset that one or more embodiments of the present invention comprise signal processing methods that may be implemented in hardware using discrete or integrated circuits, in software as stored program instructions, or in some combination thereof. More generally, one or more embodiments of the present invention may be embodied in hardware and/or software (including firmware, resident software, micro-code, etc.).

Figure 1:
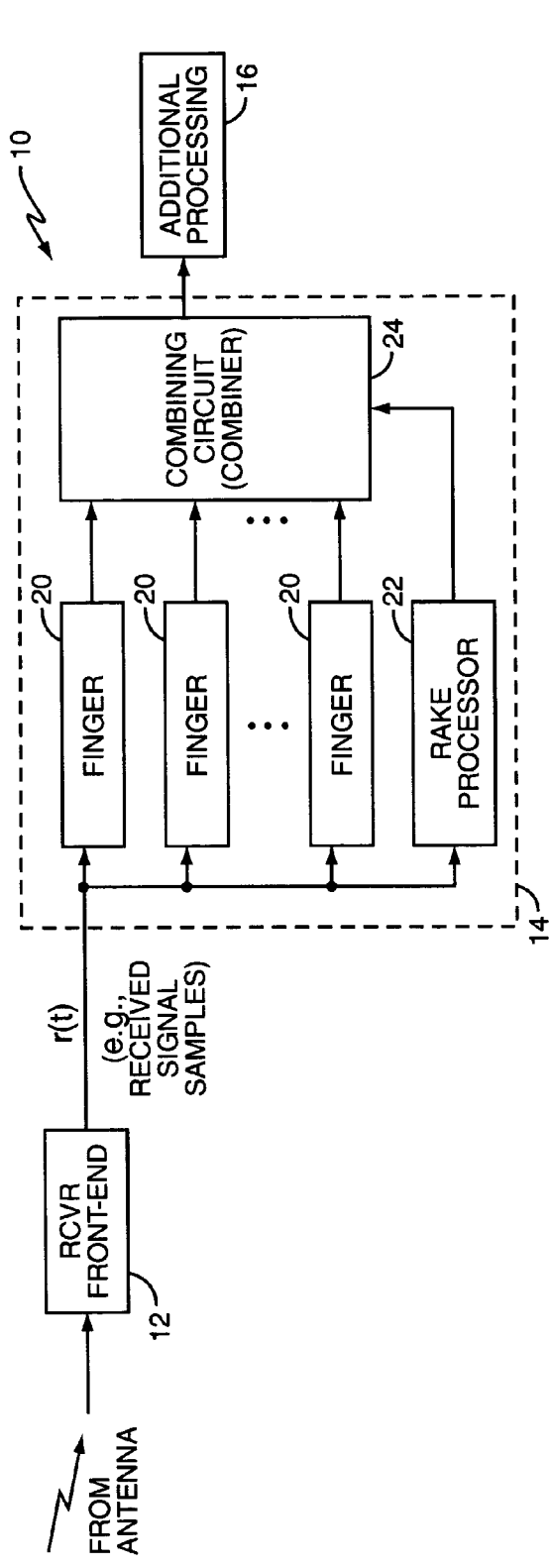
FIG. 1 is a diagram of an exemplary wireless communication receiver according to the present invention.

Turning to the drawings, FIG. 1 illustrates an exemplary receiver 10 according to one or more embodiments of the present invention. The exemplary receiver 10 comprises a radio front-end 12, a RAKE receiver 14, and additional, post-RAKE processing circuits 16, such as a convolutional or turbo decoder. All or selected portions of the RAKE receiver 14 and additional processing circuits 16 may be integrated into a baseband processor, such as a Digital Signal Processor (DSP), microprocessor, Application Specific Integrated Circuit (ASIC), Field Programmable Gate Array, Complex Programmable Logic Device (CPLD), or other processing circuit.

Regardless of such implementation details, front-end 12 provides RAKE receiver 14 with one or more received signals, which may comprise streams of sample values obtained from wireless signals impinging on an antenna, or antennas, associated with the front-end 12. Thus, an exemplary front-end 12 includes amplifiers, filters, mixers, and digitizers as needed to produce a sampled signal suitable for processing by RAKE receiver 14. The received signal samples, r(t), provided to RAKE receiver 14 may comprise samples from a composite received signal that includes one or more signal images arising from, for example, multipath propagation between receiver 10 and a remote transmitter (not shown).

Further, the received signal, r(t), may include samples from multiple transmit signals (transmit diversity) and/or samples from multiple receive signals obtained from, for example, two or more receive antennas used for receive diversity. In some embodiments, signals associated with different antennas can be routed into RAKE receiver 14 for individual, joint, or mixed processing, i.e., some processing done per signal and some done jointly.

In any case, an exemplary RAKE receiver 14 comprises a plurality of correlators (fingers) 20, a RAKE processor 22, and a combining circuit (combiner) 24. Each finger 20 despreads its input signal to produce an individual finger output signal. Combiner 24 combines the individual finger output signals according to RAKE combining weights to generate a RAKE combined signal. Fingers 20 and combining circuit 24 operate under control of RAKE processor 22.

As is understood in the art, each finger 20 can be time-aligned to despread its input signal at a desired arrival time offset, e.g., at an assigned "path" delay. Thus, in exemplary operation, RAKE receiver 14 aligns each of one or more "active" fingers 20 at least roughly with a desired signal image. (Some fingers 20 may be aligned with interference images as well.) As noted, the despread signal obtained in each finger 20 is multiplied with combining weights in association with being combined in combiner 24 to generate the RAKE combined signal. Such operation allows the RAKE receiver 14 to benefit from multipath reception by despreading multiple signal images in one or more received signals and then combining the individual despread signal outputs from each finger 20 in combiner 24.

In traditional RAKE receivers, RAKE combining weights correspond to "channel estimates" that model the propagation path of the signal image being despread by a particular finger 20. However, according to the present invention, RAKE combining weights are generated in consideration of several statistics related to despreading operations across the fingers 20. (When referring to more than one finger 20 herein, it should be understood that such reference can include all fingers.) More particularly, in an exemplary embodiment of the present invention, the RAKE processor 22 generates, or controls the generation of, combining weights that are based at least in part, on channel coefficient statistics, channel estimation error statistics, and noise statistics.

For example, RAKE processor 22 can be configured to generate estimates of channel coefficient cross-correlations for two or more fingers 20 using, for example, channel measurements obtained from a received pilot signal, e.g., received pilot symbols. Among other information, cross-correlations in the channel coefficients can compensate for correlations in signal fading or correlations in other reception phenomenon affecting all or some subset of the fingers 20.

RAKE processor 22 further can be configured to generate estimates of channel estimation error cross-correlation for two or more fingers 20 using, for example, despread pilot correlations. In one embodiment, differences between pilot correlations and corresponding channel estimates are processed and smoothed to generate noise cross-correlations for a set of fingers 20, and the noise cross-correlations are scaled according to a smoothing factor, for example, to obtain the channel estimation error cross-correlations.

In other embodiments, the channel coefficient statistics include estimates of the statistical means of channel coefficients for each finger 20 and the cross-finger relationships for estimation error and noise are expressed in terms of error covariance and noise covariance. Indeed, as explained in greater detail later herein, RAKE processor 22 can be configured to use default or nominal values that can include the assumption of a zero mean, in which case cross-finger estimation error and noise relationships are expressed in terms of covariances with an assumed zero mean.

Figure 2:
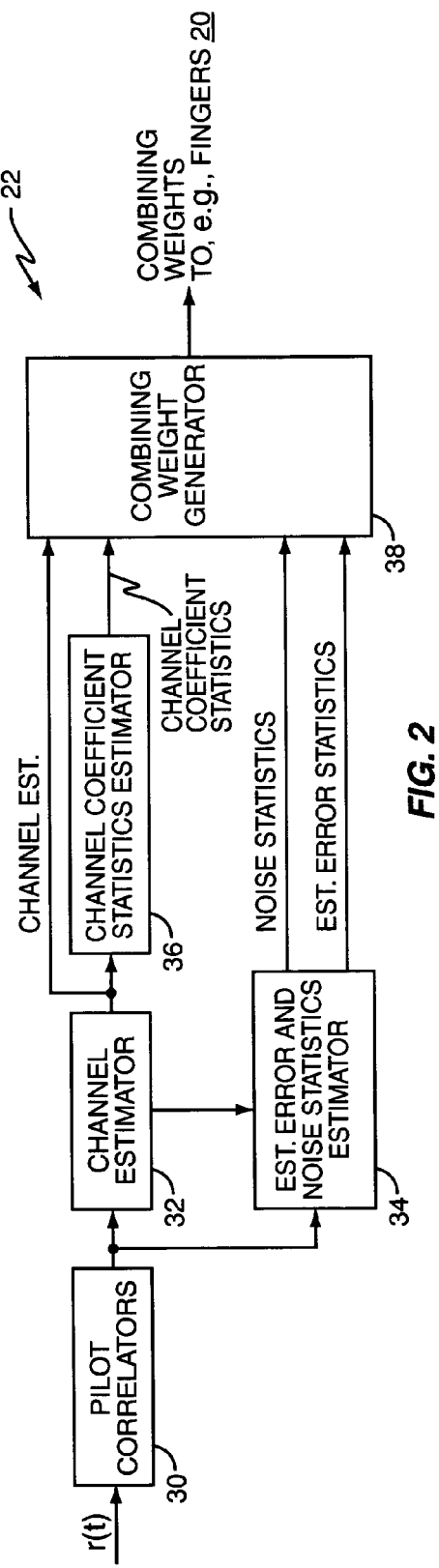
FIG. 2 is a diagram of an exemplary RAKE processor.

Supporting the above operations, FIG. 2 illustrates an exemplary RAKE processor 22 comprising pilot correlators 30, a channel estimator 32, an estimation error and noise statistics estimator 34, a channel coefficient statistics estimator 36, and a combining weight generator 38. In one aspect of its operation, performance of RAKE receiver 14 is improved by improving the combining weights. As noted, an exemplary combining weight generation method accounts for channel coefficient statistics, noise statistics, and channel estimation error statistics for two or more fingers 20.

Figure 3:
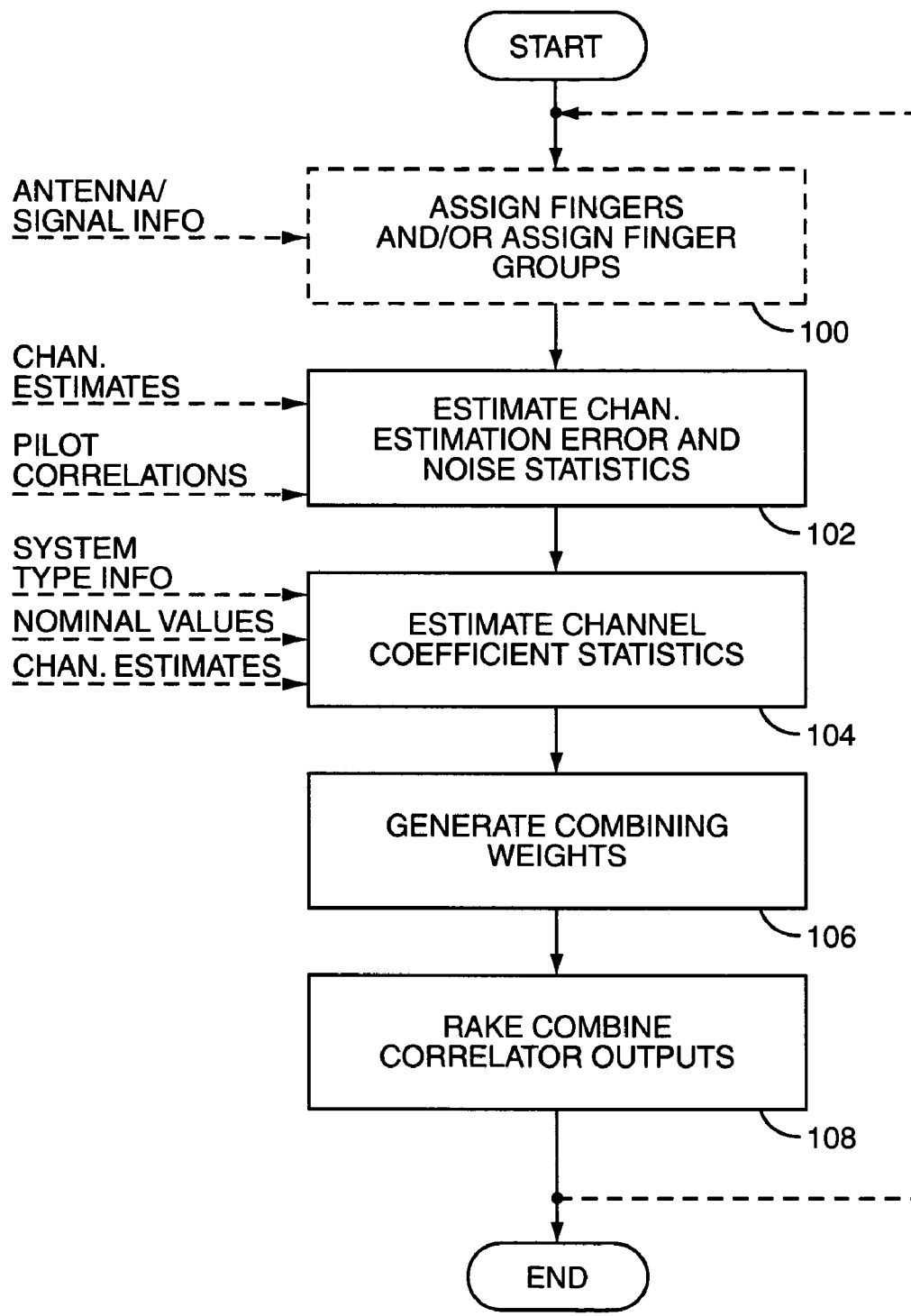
FIG. 3 is a diagram of exemplary signal processing according to one or more embodiments of the present invention.

FIG. 3 illustrates exemplary processing logic that can be implemented in RAKE receiver 14 in, for example, a programmed logic circuit executing stored program instructions, or in a dedicated logic circuit. Regardless, exemplary processing begins with the assignment of two or more fingers 20 to a given received signal (Step 100). For example, RAKE receiver 14 may assign one finger 20 to each of the three strongest signal images comprising received signal r(t). Of course, it may assign different groups of fingers 20 to different signals (e.g., from different transmit and/or receive antennas, etc.). Regardless, for a given group of fingers 20, RAKE receiver 14 estimates channel coefficient statistics, channel estimation error statistics, and noise statistics for the group of fingers 20 (Steps 102 and 104). RAKE receiver 14 may use channel estimates and pilot correlations (or data channel derived values) to determine estimation error and noise correlations, and additionally may use system type information and/or stored nominal fading statistics to estimate channel coefficient statistics such as cross-finger fading correlations.

RAKE receiver 14 uses the estimated statistics in generating the finger combining weights for the group (or groups of fingers 20) (Step 106), and then uses the generated combining weights to RAKE combine the finger outputs for the group (or groups) of fingers 20 (Step 108). Thus, RAKE receiver 14 outputs a RAKE combined signal (or signals) for subsequent processing, wherein the RAKE combined output signal is compensated using the aforementioned statistics. Such compensation improves receiver performance by accounting for relationships in noise, estimation error, and channel coefficients for the group of fingers 20.

To better understand the above exemplary processing, one must first understand that, in general, a receiver's performance is sensitive to the RAKE combining weights used. In the presence of white noise, a RAKE receiver theoretically should use combining weights that correspond to the channel coefficients for the radio channel. That is, if w denotes the combining weights and ĉ denotes the estimated channel coefficients, then $$w = \hat{c}. \quad (1)$$

When interference is better modeled as colored noise, the RAKE combining theoretically should correspond to the product of a noise covariance matrix inverse and a vector of estimated channel coefficients, such as:

$$w = R_n^{-1}\hat{c}, \quad (2)$$

where $R_n$ denotes a noise covariance matrix and ĉ denotes the estimated channel coefficient vector. Generalized RAKE receivers (GRAKE) use a combining weight form like that shown in Eq. (2), wherein the noise covariance is replaced with an estimated quantity.

In some respects, RAKE receiver 14 may be regarded as an extension of GRAKE operation in that its combining weights take on a structure similar to that given above. However, according to the present invention, exemplary combining weight generation accounts for statistics not contemplated in existing architectures.

In more detail, the exemplary channel estimator 32 generates channel estimates for each active finger 20. However, each such estimate is an imperfect representation of the corresponding actual propagation channel, which means that to a greater or lesser extent, each channel estimate includes some amount of estimation error. In one sense, the estimation error may be thought of as estimation "noise" that may be statistically related across two or more fingers 20. Thus, by estimating statistics for the estimation errors, e.g., estimating error cross-correlations for two or more fingers 20, and using such statistics in combining weight generation, the RAKE combining operations may be improved. Similarly, RAKE combining may be improved by considering additional statistics for the channel coefficients and noise as part of combining weight generation.

In examining such operations, it may be helpful to recognize that an ultimate goal of RAKE-based demodulators is to provide a log-likelihood ratio for each transmitted information bit in the received signal. One can model the vector of despread values as, $$x = cs + n, \quad (3)$$

where s is the symbol transmitted (e.g., BPSK, QPSK, 16 QAM) and n is the composite noise on the despread values. The noise may be modeled as being Gaussian with zero mean and covariance $R_n$. Similarly, one can model the channel coefficient as Gaussian with covariance $R_c$. The coefficient can be either zero mean (Rayleigh fading) or have a mean value $\bar{c}$ (Rice fading). The mean and covariance are examples of channel coefficient statistics that can be used in generating the combining weights. As will be detailed later, RAKE receiver 14 can be configured to use stored (default) statistical information for one or more fading scenarios. Receiver 14 can use such models on a selective basis, or may fix its selection of a particular fading model based on system type, e.g., high mobility or low mobility system types. However, in at least one embodiment, receiver 14 dynamically generates (estimates) the channel coefficient statistics used in combining weight generation.

In any case, the channel coefficient vector c can be estimated by correlating to pilot symbols, a pilot channel, and/or data symbols. Modulation, if any, may be removed from pilot signal/symbol (or training sequence) correlations, and the results smoothed over time. Note that if data symbols received in a data channel signal are used for channel estimation, receiver 14 can be configured to implement some form of decision feedback to remove the symbol modulation. Regardless, RAKE receiver 14 obtains a vector of channel measurements y, which can be modeled as $$y = c + e, \quad (4)$$

where e models estimation error on the channel measurements. The values in channel measurement vector y may be considered as initial channel estimates.

Determination of channel estimation error statistics can be implemented as a determination of cross-correlations for two or more fingers 20. Such cross-correlations can be obtained by modeling the errors as Gaussian with zero mean and covariance $R_e$. Because the channel measurements experience noise with the same statistical properties as the despread values obtained from the data channel signal, the covariance matrices—i.e., the channel estimation error covariance versus the traffic channel noise covariance—can be related as follows:

$$R_e = (1/K) R_n, \quad (5)$$

where K is a factor related to the amount of smoothing used in forming the channel estimates. For example, suppose channel estimates are obtained by averaging $N_p$ pilot despread values, then $K = N_p$. Thus, RAKE receiver 14 may estimate the covariance of the channel estimate error based on scaling the covariance of the received traffic signal noise.

While the examples given will focus on estimating channel estimate error correlations by scaling noise correlation estimates, the present invention can use other forms of noise and error correlation estimation. For example, noise correlations can be estimated using data despread values. Outer products of traffic data despread vectors can be averaged to obtain a traffic correlation matrix. An estimate of the channel coefficient correlation matrix can then be subtracted to obtain an estimate of the noise correlation matrix.

A first example considers the general case of Rice fading, in which the true channel coefficients are modeled as having mean $\bar{c}$ and covariance $R_c$. It can be shown that when noise in the channel measurements is accounted for in determining the likelihood of bits in a symbol s received in r(t), the combining weights should have the form $$w = A^{-1} b \quad (6)$$

where $$A = R_n + R_e(R_c + R_e)^{-1} R_c = R_n + (1/K) R_n (R_c + (1/K) R_n)^{-1} R_c, \quad (7)$$

$$b = R_c(R_c + R_e)^{-1} y + R_e(R_c + R_e)^{-1} \bar{c},$$

which can be expressed as, $$b = R_c(R_c + (1/K) R_n)^{-1} y + (1/K) R_n (R_c + (1/K) R_n)^{-1} \bar{c}. \quad (8)$$

It may be noted that the above formulations are reminiscent of the GRAKE combining weights, but with several distinctions, including these items:

1. The channel coefficient measurement vector y is replaced by a scaled version b, which is scaled as a function of covariances of the channel coefficient process and the noise process. This has the form of a minimum mean square error (MMSE) channel estimator.
2. A term is added to the scaled channel coefficient measurement vector that depends on the mean of the channel estimation coefficient vector. In one or more exemplary embodiments the term may be omitted, such as where the channel is assumed to be Rayleigh fading.
3. The noise covariance is augmented by a second term that depends on the channel coefficient statistics and the channel estimation error statistics, e.g., a term that depends on covariances of the channel coefficients and the channel estimation errors.

Thus, in one or more exemplary embodiments of the present invention, the covariance matrices are estimated at least in part from the received signal r(t) and used by RAKE receiver 14 to form the combining weights as described above.

One method of simplifying combining weight generation assumes that the channel coefficient mean is zero. This is a reasonable assumption in many cases and provides a simplification of the weights by changing the b vector to, $$b=R_c(R_c+R_e)^{-1}y=R_c(R_c+(1/K)R_n)^{-1}y, \quad (9)$$

With the above simplification, the channel coefficient covariance $R_c$ is equal to the channel coefficient correlation matrix. This simplifying approach may work well even if the true channel coefficient(s) have non-zero mean.

The noise covariance may be estimated by despreading random sequences. In an exemplary embodiment, noise covariance is estimated by despreading a pilot channel or pilot symbols and then forming channel coefficient estimates in the channel estimator 32.

The channel estimates are provided to the estimation error and noise statistics estimator 34, which subtracts the estimates from their corresponding despread values to generate noise samples. Noise samples corresponding to different pairs of fingers 20, including pairing a particular finger 20 with itself, are multiplied together (after conjugating one of the two complex samples) and smoothed over time to generate cross-finger noise correlation values. As the noise samples are assumed to have zero mean, these noise correlation values correspond to noise covariance values. In an exemplary embodiment of the present invention, the noise correlations are scaled to form channel estimation error correlations.

Figure 4:
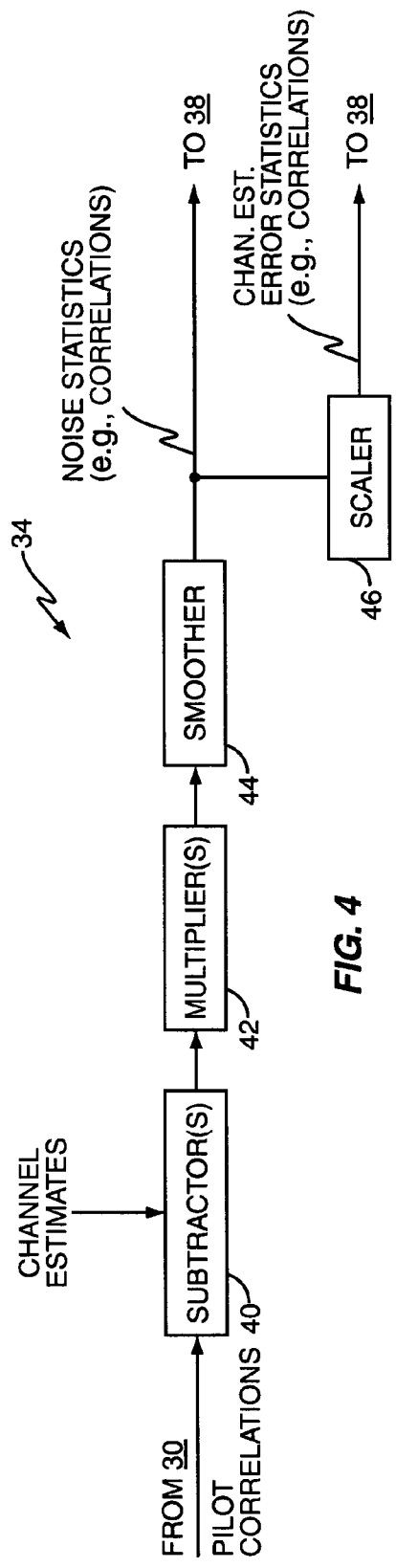
FIG. 4 is a diagram of an exemplary estimator to estimate cross-finger noise correlations and channel estimation error correlations.

FIG. 4 illustrates an exemplary embodiment of the estimation error and noise statistics estimator 34. The illustrated estimation error and noise statistics estimator 34 comprises subtractors 40, multipliers 42, and a smoother 44. In exemplary operation, estimator 34 receives channel estimates from channel estimator 32 and pilot correlations from pilot correlators 30. Note, to handle pilot symbol modulation, the pilot correlators 30 produce pilot correlations with modulation removed. Thus, subtractors 40 obtain differences between the pilot correlations and the channel estimates, which amounts to subtracting estimated pilot values from the actual pilot correlations to obtain noise values. These noise values flow into the multipliers 42, and the output of multipliers 42 feed into smoother 44. In turn, then, smoother 44 provides the combining weight generator 38 with smoothed estimates of noise correlations across some or all of the fingers 20. Scalar 46 is, in an exemplary embodiment, configured to scale the noise correlations by 1/K to generate the channel estimation error correlations.

In another exemplary embodiment, correlations between despread values are based on using pilot and/or data despread values. This gives the sum of the noise and signal correlations. The signal correlation is also estimated, as described below. Then, the signal correlation is subtracted from the despread value correlations to obtain the noise correlation.

One or more other exemplary embodiments of RAKE receiver 14 use prior knowledge of the noise. For example, in some situations, such as the uplink, it can be assumed that the noise is white. As such, RAKE receiver 14 may determine the noise correlation values as a function of the receive filter response of receiver 10 and the noise power. Specifically, the noise correlation is the product of the noise power and the receive filter autocorrelation function. The latter can usually be approximated with the transmit chip pulse shape autocorrelation, which is known. Thus, in this case, only the noise power needs to be estimated, which can be done by averaging the noise power estimates from each finger 20.

Figure 5:
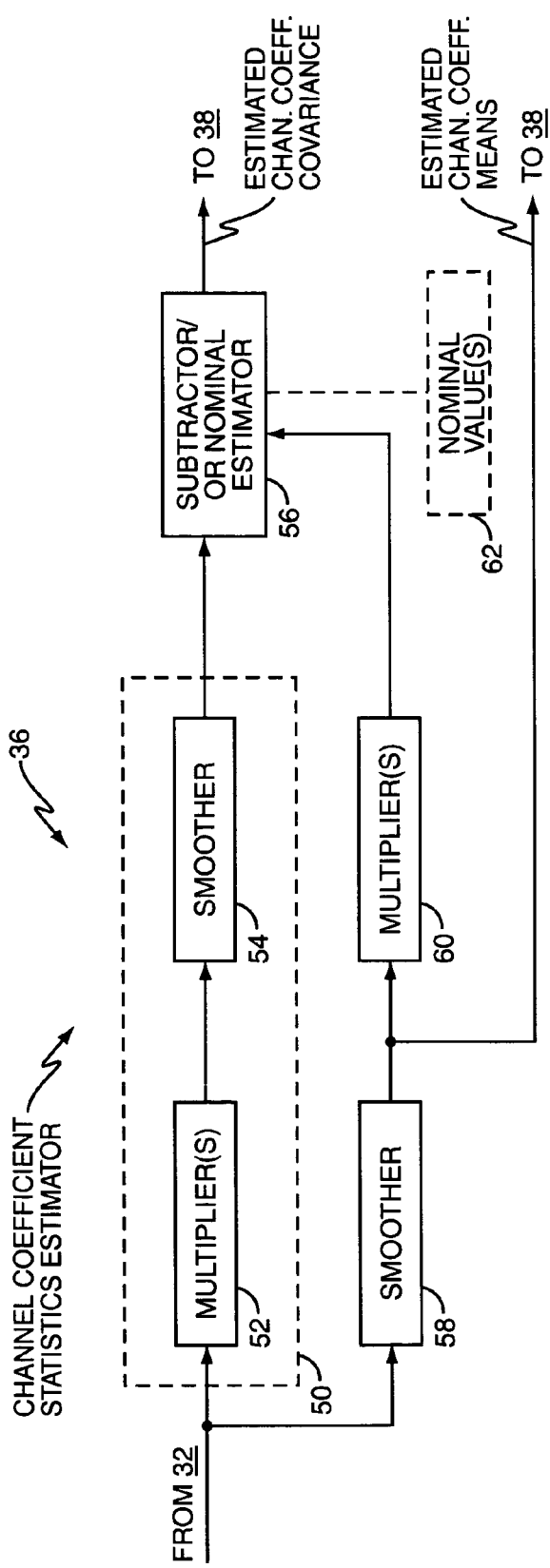
FIG. 5 is a diagram of an exemplary estimator to estimate cross-finger channel coefficient correlations.

Turning to estimation of channel coefficient statistics, FIG. 5 illustrates an exemplary embodiment of the channel coefficient statistics estimator 36. The illustrated estimator 36 comprises correlation estimator 50 that operates on channel estimates from channel estimator 32, and which comprises multipliers 52 and a smoother 54. Estimator 36 further comprises a coefficient means estimator comprising smoother 58 and multipliers 60.

Thus, the output of smoother 54 comprises channel coefficient estimate correlations, in a Rayleigh fading model where the mean is zero, the output comprises covariance estimates. The output of multiplier 60 comprises an estimate of the means of the channel coefficients. With this arrangement, then, subtractor/nominal estimator 56 included in estimator 36 provides a covariance output based on subtracting means from channel coefficient cross-correlations. Alternatively, or additionally, subtractor/nominal estimator 56 can use nominal values stored in a memory 62. For example, a nominal fading correlation across antennas of 0.7 can be used to construct a channel coefficient correlation matrix. The value 0.7 can be used or can be replaced with an estimated antenna correlation parameter. Additionally, subtractor/nominal estimator 56 may remove an estimate of the estimation error correlation matrix to convert the channel estimate covariance into the channel coefficient covariance.

In operation, estimator 36 generates channel coefficient statistics based on, for example, channel estimates, denoted as $y_k$, corresponding to different times (index k), as provided by the channel estimator 32. Either smoothed or unsmoothed channel estimates from channel estimator 32 may be used. These channel estimates are used to estimate the channel estimate cross-correlation matrix Q by forming outer products of the channel estimate vectors (products of coefficients with the conjugate of other coefficients) and smoothing. For example, with exponential smoothing, the correlation matrix would be formed using $$\hat{Q}_c(k)=\lambda\hat{Q}_c(k-1)+(1-\lambda)y_k y_k^H. \quad (10)$$

For the embodiments based on Rayleigh fading, $$\hat{R}_c(k)=\hat{Q}_c(k)-\hat{R}_e(k). \quad (11)$$

Eq. 11 can be approximated without bias removal as, $$\hat{R}_c(k)=\hat{Q}_c(k) \quad (12)$$

Further processing would not be needed, as the mean is assumed to be zero ($\hat{c}=0$). Thus, the channel coefficient correlation output may be taken from the correlation estimator 50.

With Rice fading, the non-zero mean can be estimated by exponentially smoothing y. Thus, the channel estimates would be smoothed using, for example smoother 58, which may operate as an exponential smoother, giving a mean estimate of $$\hat{\bar{c}}(k) = \lambda \hat{\bar{c}}(k-1) + y_k. \tag{13}$$

Then, the mean estimate and correlation matrix estimate may be used to determine the covariance according to $$\hat{R}_c(k) = Q_c(k) - \hat{\bar{c}}\hat{\bar{c}}^H - \hat{R}_e(k). \tag{14}$$

An outer product of the mean estimate vector may be formed using multipliers 60. The resulting outer product matrix may then subtracted from the correlation matrix using subtractor/estimator 56 to obtain a covariance matrix as the cross-finger fading correlation output to be used by combining weight generator 38. Due to the Hermitian property of the correlation and covariance matrices, only the diagonal and one triangle (upper or lower) need to be estimated and stored.

Note that subtractor/estimator 56 may operate on a selective basis under control of RAKE processor 22, for example, and thus may provide default channel coefficient correlations as its output, or provide generated values based on the received signal, based on the receiver filter pulse shape, etc. Regardless, estimator 36 provides combining weight generator 38 with channel coefficient statistics, such as coefficient means and/or estimates of channel coefficient correlations across two or more fingers 20 of the RAKE receiver 14.

Together, estimators 34 and 36 together provide combining weight generator 38 with estimates of channel coefficient, estimation error and noise statistics relating a pair of fingers 20, a group of fingers 20, etc. Indeed, such statistics may be generated independently for different groups of fingers 20, e.g., correlations across a first group of fingers 20, and separately determined correlations across another group of fingers 20, etc. For example, each group could correspond to a different base station signal in soft handover in the downlink. Another example is grouping fingers from different receive antennas that correspond to the same path delay.

In any case, FIG. 6 illustrates an exemplary embodiment of the combining weight generator 38, which comprises a weight solver 64, a vector generator 66, and a matrix generator 68. It should be understood that these elements represent functional but not necessarily separate physical elements of combining weight generator 38, and that these functions may be performed together in the RAKE processor 22, which itself may be implemented as part of a baseband signal processor, or other logic circuit, e.g., a microprocessor executing a stored computer program.

With the illustrated implementation, solver 64 outputs the desired RAKE combining weights based on the b vector generated by vector generator 66, and the A matrix generated by matrix generator 68. Thus, once the channel estimation error correlations, noise correlations, and channel coefficient correlations have been estimated, these statistics can be used in Eqs. (7) and (8) to form the quantities A and b. Both of these quantities contain the term $$B=R_c(R_c+R_e)^{-1}=R_c(R_c+(1/K)R_n)^{-1}. \tag{15}$$

Taking Hermitian transpose and using the Hermitian properties of the matrices gives $$B^H=(R_c+R_e)^{-1}R_c. \tag{16}$$

This term can be computed and used for both quantities. An exemplary method is based on RAKE processor 22 forming a matrix inverse. Another exemplary method is based on RAKE processor 22 determining $B^H$ one column at a time by solving the system $$(R_c+(1/K)R_n)f=g, \tag{17}$$

where g is a certain column in $R_c$ and f is the corresponding column in $B^H$. Several options are available to solve for f. In an exemplary method, RAKE receiver 22 implements an iterative Gauss-Seidel approach. An initial value for f may be the result from a previous time period, for example. RAKE receiver 22 may implement a similar method to compute $$(1/K)R_n(R_c+(1/K)R_n)^{-1}.$$

Thus, the exemplary vector generator 66 receives the channel estimates from channel estimator 32, the signal fading correlation estimates from estimator 36, and the estimation error and noise correlation estimates from estimation error and noise statistics estimator 34. Similarly, matrix generator 68 receives the channel coefficient covariance estimate from estimator 36, and the error and noise correlation estimates from estimation error and noise statistics estimator 34.

Once the quantities A and b are formed, then Eq. (6) can be used to solve for the combining weights. An iterative approach, such as Gauss-Seidel, can be used to solve for w. The solution can be initialized to the previous solution for the w. Alternatively, it can be initialized to Db, where D is a diagonal matrix obtained by setting the off-diagonal elements of the A matrix to zero and then inverting the diagonal elements. Regardless, solver 64 (as part of combining weight generator 38) may be programmed to implement the above processing based on, for example, stored program instructions, micro-code, etc.

Thus, RAKE receiver 14 comprises one or more signal processors and/or logic circuits, including RAKE processor 22, that generate RAKE combining weights based at least in part on estimates of error and noise correlations and signal fading (channel coefficient) correlations across two or more fingers 20 of RAKE receiver 14. However, it should be understood that compensating the combining weights in this manner can be extended to embodiments that use transmit diversity and/or receive diversity.

To reduce complexity, various approximations can be made. For example, at reasonable channel estimation error levels, RAKE receiver 14 may approximate A as $$A \approx R_n. \tag{18}$$

In another approximation, which may be used with or without the first approximation, the RAKE receiver 14 is configured to base its processing on an assumed Rayleigh fading model. With Rayleigh fading, RAKE processor 22 does not estimate $\bar{c}$; rather it sets the value to zero. Such an assumption simplifies Eq. (8) to the form given as Eq. (9).

In considering single channel measurements, such measurements may correspond to a single cluster of pilot symbols, or to a moving average estimate of many channel measurements, based on pilot and control data symbols, such as would occur in a WCDMA uplink. However, RAKE receiver 14 may gain performance advantages by processing multiple measurements using Wiener filtering techniques for channel estimation and tracking. The matrix quantities used in Wiener channel estimation can also be used to augment the noise covariance matrix.

More particularly, one may consider a vector of despread values corresponding to discrete time k, $$x_k = c_k s + n_k, \quad (19)$$

and may further consider multiple channel measurements corresponding to times $i = i_1, i_2, \ldots i_M$, as $$y_i = c_i + e_i \quad (20)$$

The measurements may include a measurement at time k (e.g., $i_3 = k$) and they may include future time measurements (e.g., $i_4 = k+6$).

The time-varying fading coefficients $c_k$ can be characterized by a time-varying (or time-invariant) mean $\bar{c}_k$ and a covariance matrix function as a function of lag $\tau$, $$R_c(\tau) = E\{c_{k+\tau} c_k^H\}. \quad (21)$$

It is reasonable to assume that the channel measurement noise $e_i$ is uncorrelated from measurement to measurement, and each measurement has covariance $R_e$.

In this exemplary embodiment, the RAKE combining weights used by RAKE receiver 14 still have the form given earlier in Eq. (6), except $$A = R_n + R_c(0) - p^H R_y^{-1} p, \quad (22)$$

$$b = p^H R_y^{-1} (y - \bar{y}) + \bar{c}_k, \quad (23)$$

where $$p = [R_c(k-i_1) R_c(k-i_2) \ldots R_c(k-i_M)]^T, \quad (24)$$

$$R_y = E\{yy^H\}, \quad (25)$$

$$y = [y_{i_1}, \ldots y_{i_M}]^T, \quad (26)$$

and $$\bar{y} = [\bar{c}_{i_1} \ldots \bar{c}_{i_M}]^T. \quad (27)$$

With the above, RAKE receiver 14 may express $R_y$ in terms of $R_c(\tau)$ and $R_n$. The diagonal elements are all equal to $R_c(0) + (1/K)R_n$. The off-diagonal element for row r and column c is given by $R_c(i_r - i_c)$. RAKE receiver 14 may estimate the noise statistics ($R_n$) as described earlier herein, and may estimate the channel coefficient statistics according to one or more exemplary methods.

One exemplary method uses the channel measurements $y_k$ from different time periods (index k). RAKE receiver 14 can smooth products of the different channel measurements using, for example, exponential smoothing, to obtain an estimate of the channel coefficient correlation matrix sequence $Q(\tau)$ (sequence in $\tau$). Specifically $$\hat{Q}_c(\tau)(k) = \lambda \hat{Q}_c(k-1) + (1-\lambda) y_{k+\tau} y_k^H. \quad (28)$$

For the embodiments based on Rayleigh fading, the correlation and covariance matrices are the same, so $$\hat{R}_c(\tau)(k) = \hat{Q}_c(\tau)(k) - \hat{R}_e(k), \quad \tau = 0, \quad (29)$$

$$= \hat{Q}_c(\tau)(k), \quad \tau \neq 0$$

Where RAKE receiver 14 models fading based on a Rice model, i.e., non-zero fading mean, RAKE receiver 14 estimates the mean. However, to simplify processing, RAKE receiver 14 may be configured to assume a fading mean that changes slowly in time such that it can be estimated by exponentially smoothing $y_k$. The mean may have the form of a slowly varying constant that is rotating according to a Doppler shift. RAKE receiver 14 may estimate the Doppler shift using known approaches and estimate the constant value by de-rotating $y_k$ and averaging. RAKE receiver 14 then rotates the constant value according to the Doppler shift to thereby obtain an estimate of $\bar{c}_k$.

RAKE receiver 14 may then use the mean vector and correlation matrix to determine the covariance as $$\hat{R}_c(\tau)(k) = \hat{Q}_c(\tau)(k) - \hat{R}_e(k) - \bar{c}_k \bar{c}_k^H, \quad \tau = 0, \quad (30)$$

$$= \hat{Q}_c(\tau)(k), \quad \tau \neq 0.$$

To reduce measurement noise, RAKE receiver 14 optionally may model the time-varying fading process using a parameterized model, such as an autoregressive moving average (ARMA) process. Then, instead of estimating $R_c(\tau)$, one can estimate the ARMA model parameters and use these parameter estimates to form $R_c(\tau)$.

Once the noise and channel coefficient statistics have been estimated, RAKE receiver 14 may then use the estimates as illustrated in Eqs. (22) and (23) to form the quantities A and b. Observe that both of these quantities contain terms of the form $R_y^{-1} v$, where v is a vector. As discussed previously, RAKE receiver 14 may implement iterative solutions, as it might for final combining weight computations.

As noted earlier, RAKE receiver 14 may make one or more simplifying assumptions, for example to reduce signal processing requirements. As mentioned, RAKE receiver 14 may use a Rayleigh fading model, in which case it assumes that $\bar{c}_k$ is zero. That assumption simplifies Eq. (23) to $$b = p^H R_y^{-1} y. \quad (31)$$

The use of channel coefficient, estimation error, and noise statistics in forming combining weights as described herein is referred to as improved combining weight generation. RAKE receiver 14 may or may not implement improved combining weight generation, or may implement improved combining weight generation on a selective basis. Improved combining weight generation offers performance gains in at least some circumstances, such as when the channel consists of a single path as in the "case 0" test channel in W-CDMA. With such a channel, RAKE receiver 14 may place a grid of fingers 20 about the signal image, i.e., assign two or more of its fingers to grid assignment positions that coincide with the received signal image.

Figure 7:
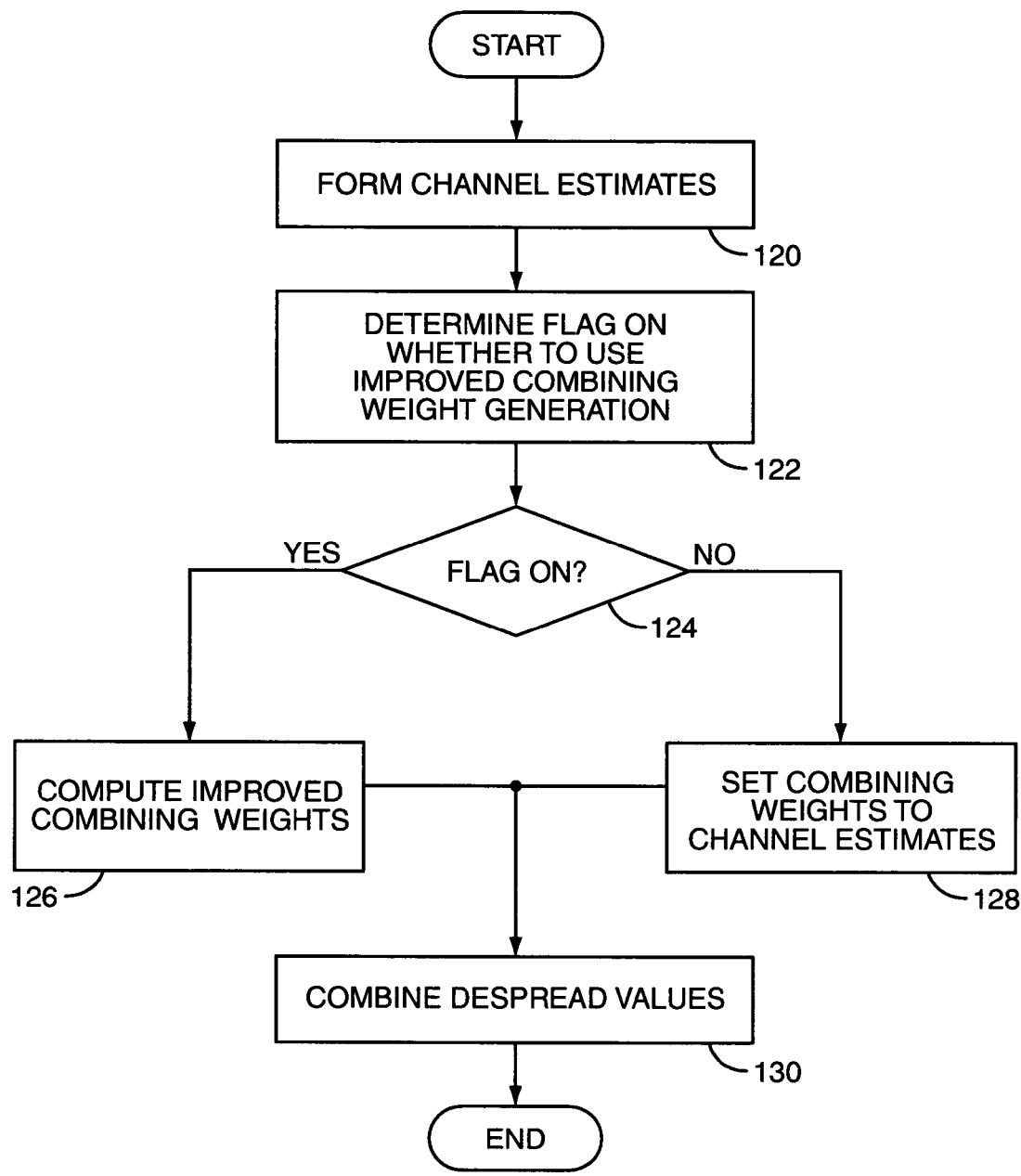
FIG. 7 is a diagram of exemplary logic implementing selective improved combining weight generation according to one or more embodiments of the present invention.

Exemplary logic for selective improved combining weight generation is illustrated in FIG. 7. As before, RAKE receiver 14 generates channel estimates for the received signal (Step 120), but then determines whether to use improved combining weight generation based on, for example, a logic flag, which may be set based on system type, user preference, etc. (Step 122). If the flag is set (Step 124), RAKE receiver 14 uses improved combining weight generation (Step 126). If the flag is not set, RAKE receiver 14 does not use the improved combining weight generation, e.g., it sets the combining weights to the channel estimates, or selectively uses a subset of the combining statistics (Step 128). In either case, RAKE receiver 14 then uses the combining weights to RAKE combines the despread values, i.e., the despread data signal outputs from the fingers 20 under consideration (Step 130), to obtain the RAKE combined output for subsequent processing, e.g., demodulation and decoding. Selection can be extended to other forms, e.g., selection between RAKE combining weight generation based on the channel estimates, GRAKE combining weight generation based on the noise covariance, and improved combining weight generation based on the combining statistics.

Ideally, for Step 122, the rank of an estimate of $R_c(0)$ would be used. If the matrix is not full rank or is ill-conditioned, then improved combining weight generation by RAKE receiver 14 may improve performance. In a less computationally intense approach, RAKE receiver 14 examines the size of the off-diagonal elements, relative to the largest of the corresponding diagonal elements. If this relative size is close to 1 in magnitude, then the fading is highly correlated and it may be assumed that use of improved combining weight generation will improve receiver performance.

Specifically, one or more embodiments of improved combining weight generation can be applied to groups of fingers 20 such as where one finger 20 in the group has high fading correlation with at least one other finger 20 in the group. RAKE receiver 14 may determine whether there is high correlation by denoting the two fingers 20 being considered as "1" and "2." Also, let $r_c(1, 1)$, $r_c(2, 2)$ and $r_c(1, 2)$ denote the elements in covariance estimated $R_c$ corresponding to covariance of finger 1 with 1, finger 2 with 2, and finger 1 with 2, respectively. RAKE receiver 14 measures normalized fading correlations between these two fingers 20 using, for example, $$p = \frac{|r_c(1, 2) - \bar{c}(1)\bar{c}(2)|}{\sqrt{r_c(1, 1)} \sqrt{r_c(2, 2)}}. \tag{32}$$

The above expression yields a number roughly between 0 and 1, that can be thresholded by RAKE receiver 14 to determine whether the cross-finger fading is highly correlated. The normalized correlation can be approximated using $$p \approx \frac{|r_c(1, 2) - \bar{c}(1)\bar{c}(2)|}{\max\{r_c(1, 2), r_c(2, 2)\}}. \tag{33}$$

Also, for the Rayleigh model case, subtraction of the product of means can be omitted.

Improved combining weight generation provides gains for closely spaced fingers 20, where there typically is a higher cross-finger fading correlation. Thus, RAKE receiver 14 may apply improved combining weight generation to a cluster of fingers 20 that are spaced closely together, while applying a subset of the combining statistics or foregoing improved combining weight generation on one or more other fingers 20 or groups of fingers 20 that are not so closely spaced. In other words, RAKE receiver 14 may operate in a first mode where it computes combining weights based on the combining statistics (channel coefficient, estimation error, and noise statistics), or in a second mode where it computes combining weights based on a subset of the combining statistics. Such selective operation can be based on evaluating the normalized fading correlation.

Additionally, RAKE receiver 14 may apply its inventive improved combining weight generation to transmit diversity and/or receive diversity scenarios. That is, the present invention may be applied when, for example, there are multiple transmit antennas employing some form of transmit diversity or space-time coding. The present invention can be applied separately for each transmitted signal received at one or more receive antennas. Improved combining weight generation can be performed per diversity signal (e.g., per transmit or receive antenna), or can be performed jointly for all of the diversity signals, or for selected subsets of the diversity signals.

An example of transmit diversity is illustrated in FIG. 8, wherein a transmitter 70 transmits multiple transmit signals from a plurality of antennas 72, e.g., 72-1, 72-2 and 72-3. As such, receiver 10 receives multiple signals, each of which may include multiple signal images.

If the multiple transmit antennas 72 are used to focus a single information signal, then the present invention can be implemented in a number of exemplary embodiments, depending on, for example, the use of pilot information. In the WCDMA standard, for example, pilot channels are transmitted from each transmit antenna 72 so that the receiver 10 can feed back information to allow focusing of the traffic channel signal. In this case, there is only one traffic channel signal, but the channel response is the sum of the responses from the multiple transmit antennas, which are estimated separately by receiver 10 using pilot channels from the different transmit antennas 72.

For simplicity, assume that the network transmitter 70 transmits to receiver 10 from two antennas, 72-1 and 72-2. The traffic channel despread values can be modeled as $$x = (c+d)s + n, \tag{34}$$

where c is the response from one antenna 72 and d is the response from the other antenna 72. On this basis, RAKE receiver 14 of receiver 10 obtains channel measurement vectors from each antenna's pilot channel signal, giving $$y_1 = c + e, \tag{35}$$

and $$y_2 = d + f. \tag{36}$$

RAKE receiver 14 may apply the same smoothing to each pilot channel and thus determine the estimation error covariance as, $$R_e = R_f = (1/K)R_n. \tag{37}$$

Of course, those skilled in the art will recognize that the above expression may be extended where RAKE receiver 14 does not apply the same smoothing to each pilot channel signal.

With the above in mind, the proposed combining weights are given by $$w = A^{-1}b, \tag{38}$$

where $$A = R_n + R_e(R_c + R_e)^{-1}R_c + R_f(R_d + R_f)^{-1}R_d \tag{39}$$
$$= R_n + (1/K)R_n(R_c + (1/K)R_n)^{-1}R_c +$$
$$(1/K)R_n(R_d + (1/K)R_n)^{-1}R_d$$

$$b = R_c(R_c + R_e)^{-1}y_1 + R_d(R_d + R_f)^{-1}y_2 + \tag{40}$$
$$R_e(R_c + R_e)^{-1}\bar{c} + R_f(R_d + R_f)^{-1}\bar{d}$$
$$= R_c(R_e + (1/K)R_n)^{-1}y_1 + R_d(R_d + (1/K)R_n)^{-1}y_2 + +$$

$$(1/K)R_n(R_c + (1/K)R_n)^{-1}\bar{c} + \tag{41}$$
$$(1/K)R_n(R_d + (1/K)R_n)^{-1}\bar{d}.$$

The channel coefficient statistics can be estimated separately from each pilot channel. The noise statistics can be estimated separately on each pilot channel then averaged, or simply estimated from one of the two pilot channels. The weight approximation approaches described earlier can also be used. These include assuming Rayleigh fading ($\bar{c}=\bar{d}=0$) and approximating $A \approx R_n$. Also, this form can be used with multiple measurements in time, replacing the channel estimates with MMSE estimates and adjusting A accordingly.

Similarly, it should be noted that RAKE receiver 14 can perform its inventive signal processing even where the signal used for estimating the propagation channel(s) has a different power level than the data channel (traffic) signal. Such power differences are common in at least some types of CDMA-based wireless communication networks wherein the traffic channel signal for a given user is transmitted at some scaled power relative to the pilot signal for that user.

For example, the relative power levels of the traffic channel and pilot signals typically are known at receiver 10, or can be estimated. If $\beta$ is the ratio of power (or energy) on the pilot channel to power on the traffic channel, $L_p$ is the spreading factor used for pilot despreading, and $L_t$ is the traffic channel spreading factor, then a scaling factor "a" can be computed as, $$a = \beta L_p / L_t. \quad (42)$$

Thus, in an exemplary embodiment, RAKE receiver 14 scales the channel measurements by a so that they have the form given in Eq. (4), where c corresponds to the traffic channel. The power relation may be known or estimated, as described in the co-pending U.S. patent application entitled "Communication Methods, Apparatus and Computer Program Products Using Gain Multipliers" filed on Oct. 21, 2001, and assigned application Ser. No. 09/968,443.

In another exemplary embodiment, scaling factor "α" is used in a different way to account for differences in received power (or energy) levels between pilot and traffic symbols or signals. That is, in a process where channel coefficients are estimated from one channel, e.g., a pilot channel, but used to compensate or correct values received on another channel, e.g., a traffic channel, performance can be improved if the estimation process accounts for differences between the two channels. In the earlier described Eq. 7 and selected others herein, it was assumed the same power and same spreading factor for pilot and traffic symbols.

With this approach, the channel coefficient statistics, channel estimation error statistics, and noise statistics can be computed without accounting for pilot-to-traffic channel differences. Then, the scaling factor a can be introduced into combining weight generation to provide that accounting. Thus, Eq. 7 can be recast as, $$A = R_n + a^2 R_e (R_c + R_e)^{-1} R_c = R_n + a^2 (1/K) R_n (R_c + (1/K) R_n)^{-1} R_c, \quad (7a)$$

$$b = a R_c (R_c + R_e)^{-1} y + a R_e (R_c + R_e)^{-1} \bar{c}.$$

Similarly, with respect to Eqs. 22-27, the scaling factor a can be applied by calculating the diagonal elements of $R_y$ as $a^2 R_c(0) + (1/K) R_n$. Further, the off-diagonal element for row r and column c is given by $a^2 R_c(i_r - i_c)$.

Further, for multiple antenna signal processing, a different scaling factor a can be computed for each antenna, e.g. $a_1$ for Eq. 35 and $a_2$ for Eq. 36. Thus, Eqs. 39 and 40 can be recast as, $$A = R_n + a_1^2 R_e (R_c + R_e)^{-1} R_c + a_2^2 R_f (R_d + R_f)^{-1} R_d, \text{ and} \quad (39a)$$

$$b = a_1 R_c (R_c + R_e)^{-1} y_1 + a_2 R_d (R_d + R_f)^{-1} y_2 + a_1 R_e (R + R_e)^{-1} \bar{c} + a_2 R_f (R_d + R_f)^{-1} \bar{d}. \quad (40a)$$

Thus, the above details demonstrate that the present invention can account for differences between the channel on which channel coefficient estimates are based, and a channel of interest. In particular, differences between traffic and pilot channels can be accounted for either in the formation of the combining statistics, or later in combining weight generation. It should be understood that the present invention encompasses these and other approaches and that, in some embodiments, the present invention does not attempt to scale or otherwise account for such differences. In general, then, it should be understood that channel scaling is provided for herein but whether and in what manner such scaling is implemented is a matter of design.

Turning to additional diversity scenario details, FIG. 9 illustrates an exemplary receive diversity embodiment, wherein receiver 10 comprises front-end 12, RAKE receiver 14, and additional processing circuits 16 as before, but additionally comprises a plurality of receive antennas 74, e.g., antennas 74-1, 74-2 and 74-3. Note, too, that RAKE receiver 14 in this embodiment may additionally comprise a buffer/selector 75 to route different ones of the antennal signals (or combinations of antenna signals) to different fingers 20. As such, one group of fingers 20 may process signals from one antenna 74, or one or more groups of fingers 20 may process two or more antenna signals simultaneously. As such, the RAKE combined output(s) from combiner 24 may represent RAKE combined signals on a per antenna basis, or RAKE combined signals across two or more of the antennas 74.

In an exemplary embodiment, fingers 20 corresponding to different antennas (72 and/or 74) are collected together by RAKE receiver 14 and viewed as one large set of fingers 20 that produce a vector of despread values x. Thus, cross-antenna channel coefficient correlations are reflected in the $R_c$ matrix. Alternatively, if the channel coefficients are known to have low correlation, e.g., RAKE receiver 14 has prior knowledge or prior estimations, the channel coefficients can be treated as uncorrelated.

In that case, an exemplary embodiment of RAKE receiver 14 uses improved combining weight generation separately for each received antenna signal prior to adding the results in its RAKE combined output(s). Note that such per-antenna processing may be applied or not applied on a selective basis as described above.

The same alternatives exist for noise and estimation error correlation estimations. Those estimations can be performed jointly over multiple receive antennas, so that cross-antenna noise correlations and channel estimation error correlations are reflected in $R_n$ and $R_e$. Such estimations also can be performed separately for each antenna. Together with the two alternatives for channel coefficient cross-correlation estimation, there are four exemplary combinations for processing signals received on two (or more antennas)

Of particular interest is the combination in which noise and error correlation estimations are performed separately for each antenna's received signal, whereas channel coefficient correlations are estimated across the antennas. Stated more broadly, RAKE receiver 14 can be configured to generate channel estimation error statistics and noise statistics that reflect the relationships of estimation errors and noise on a per antenna basis, while simultaneously generating channel coefficient statistics reflect the relationships in channel coefficients across the antennas. This makes sense where noise and interference are considered fairly uncorrelated between antennas but fading is highly correlated because of, for example, close physical spacing of the receive antennas.

The method also may make sense where tested sensitivity performance is important, in which the signal levels on the receive antennas are the same, within a phase rotation. In that case, the overall joint scaling solution is obtained by considering fingers assigned to different antennas together as one large set. The noise and error correlation matrices can be constructed as block diagonal matrices, with diagonal blocks corresponding to the per-antenna correlation matrices.

More generally, the present invention can be configured to process diversity signals, i.e., signals transmitted from, or received on, two or more antennas according to one or more exemplary embodiments that involve separate (per signal) statistics estimation, joint (cross-antenna) statistics estimation, or a mix of joint and separate processing. For separate processing of a diversity signal, combining statistics are estimated for the fingers 20 allocated to that signal, and for joint processing of two or more diversity signals, the combining statistics are estimated for all of the fingers 20 allocated to the diversity signals.

As a further element of its flexibility, it also should be noted that one or more embodiments of the present invention can be applied in the downlink to the soft handoff or handover situation. In that instance, RAKE receiver 14 may, on a separate basis, jointly scale the fingers 20 associated with each particular base station signal. Of course, RAKE receiver 14 also can be used in the uplink in one or more exemplary embodiments. In one embodiment, RAKE receiver 14 is implemented within a base station receiver system, and jointly scales different antenna signals by collecting fingers 20 assigned to different antennas as a combined set of fingers 20.

In such embodiments, RAKE receiver 14 estimates noise correlation between fingers 20 that are assigned to different antennas and uses the estimated correlations in combining the despread finger outputs. Such operation has the advantage of suppressing dominant interfering signals. If, for example, two or more receive antennas 74 for receiver 10 are not co-located at the same "site," an exemplary embodiment is based on each antenna site sending receiver data to a centralized processing location for improved combining weight generation. In an alternative embodiment, each site applies joint scaling to each antenna signal separately, so that fingers 20 associated with a particular receiver antenna 74-x (x=1, 2, etc.) are combined together. The combined results from different antennas 74 may be added prior to decoding. Alternatively, each antenna signal may be decoded separately, to reduce the amount of data transmitted between sites.

Figure 10:
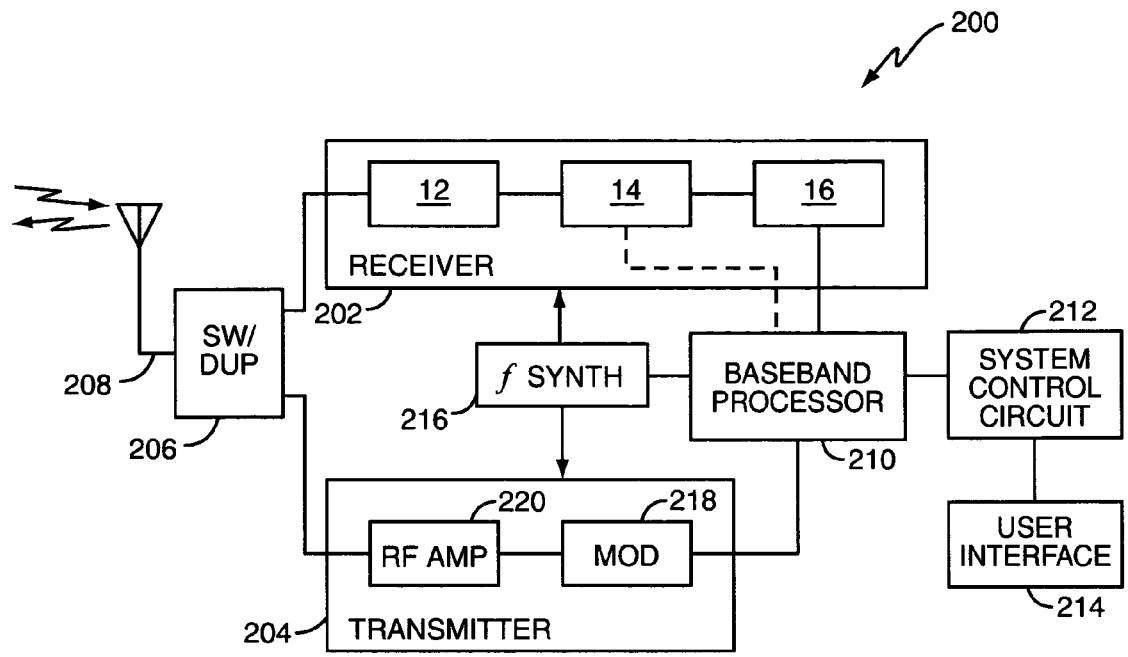
FIG. 10 is a diagram of an exemplary mobile terminal.
Figure 11:
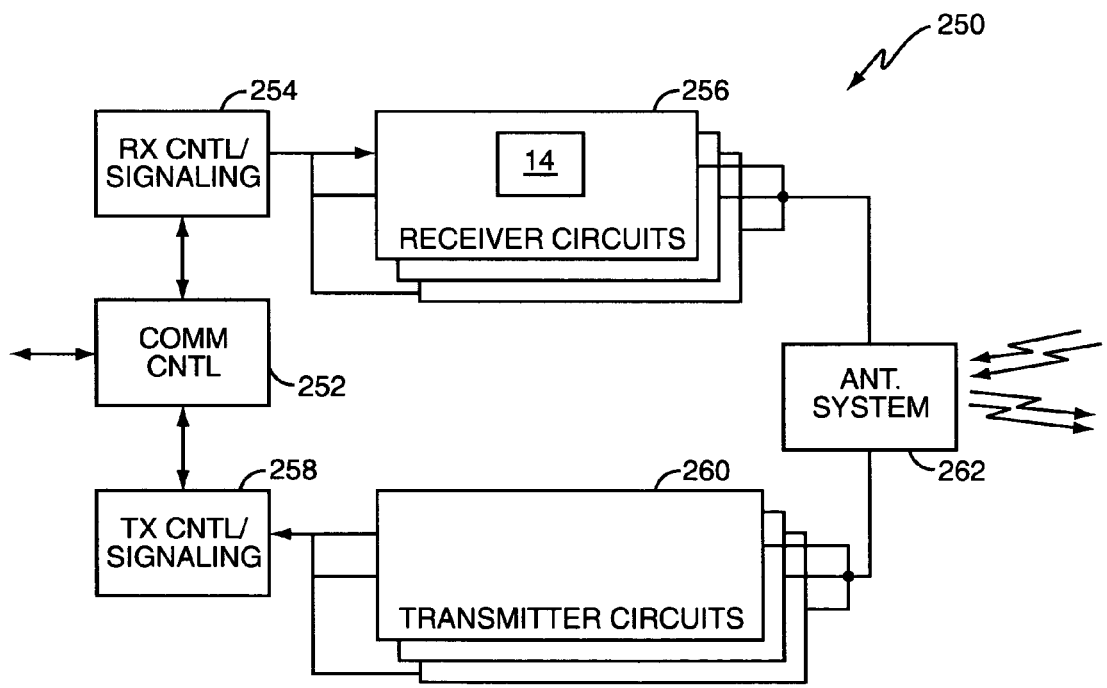
FIG. 11 is a diagram of an exemplary radio base station.

Given the above flexibility with regard to uplink-based and downlink-based embodiments of the present invention, FIGS. 10 and 11 illustrate, respectively, an exemplary mobile terminal embodiment (downlink) and an exemplary radio base station embodiment (uplink).

FIG. 10 illustrates an exemplary mobile terminal 200 intended for use in a wireless communication system. As used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals also may be referred to as "pervasive computing" devices.

The illustrated mobile terminal 200 includes a receiver 202, a transmitter 204, a switch/duplexer 206 with an associated antenna 208 (which may be the same as or like the earlier illustrated antenna(s) 74), a baseband processor 210, a system control circuit 212 and an associated user interface 214, which may include display screens, keypads, audio input and output transducers, etc., and a frequency synthesizer 216. Of particular interest, receiver 202 may include one or more embodiments of the exemplary RAKE receiver 14 and post-RAKE processing circuits 16 as earlier described herein. Thus, mobile terminal 200 may benefit from any or all of the earlier described combining statistics estimation and combining weight generation methods.

It should be understood that some overlap can exist in the implementation of receiver 202 and processor 210. For example, processor 210 can comprise a Digital Signal Processor (DSP), ASIC, or other signal processing circuit that can be programmed, or otherwise configured, to incorporate some or all of the functionality of RAKE receiver 14. Thus, determination of combining statistics and combining weight generation can be performed using the signal processing resources of processor 210. In other embodiments, such RAKE processing can be implemented in another circuit, such as in a RAKE processor integrated circuit, e.g., an ASIC or other IC device, that incorporates all or some of RAKE receiver's exemplary processing methods.

RAKE receiver 14 yields operational benefits when applied to other communication network entities such as where it is used in a radio base station (RBS) 250, which also may be referred to as a base transceiver station (BTS). Note that operation of RAKE receiver 14 can be configured differently depending on whether it is used in receiving uplink signals from mobile terminals 200 or is used in receiving downlink signals from RBSs 250. For example, the earlier described pilot-to-traffic channel scaling can be configured to account for the differences in uplink and downlink power control and differences in channel-to-channel power relationships.

Regardless, an exemplary RBS 250 includes communication control resources 252, receiver control and signaling resources 254, a plurality of receiver circuits 256 including one or more RAKE receivers 14, transmitter control and signaling resources 258 and associated transmitter resources 260, along with an antenna system 262 for receiving and transmitting wireless signals to and from mobile terminals 200 or other remote entities. Note that the antenna system 262 may comprise, or otherwise include, one or more of the previously illustrated transmit antennas 72.

Given its broad range of applications and the variety of systems in which the present invention may be implemented, those skilled in the art should appreciate that the present invention may be embodied in any number of specific physical implementations. For example, the processing associated with the combining statistics generation methods described herein may be supported by dedicated hardware, or implemented in software, or implemented as some combination of the two. More generally, the present invention may be embodied in hardware and/or software (including firmware, resident software, micro-code, etc.). Furthermore, the present invention may take the form of a computer program product on a computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. Examples of computer readable mediums include, but are not limited to, magnetic storage devices, optical storage devices, and integrated circuit storage devices such as EPROM, EEPROM, FLASH, etc.

Additionally, those skilled in the art should recognize that the foregoing description and the accompanying illustrations represent exemplary embodiments of the present invention and should not be construed as limiting it. Indeed, the present invention is limited only by the following claims and the reasonable equivalents thereof.

What is claimed is:

1. A method of generating RAKE combining weights in a RAKE receiver, the method comprising:
    obtaining individual finger output signals by despreading a received signal in each of two or more RAKE fingers;
    generating channel estimates corresponding to the RAKE fingers;
    determining combining statistics comprising channel coefficient statistics, channel estimation error statistics, and noise statistics for the RAKE fingers; and
    computing RAKE combining weights for combining the individual finger output signals from the RAKE fingers into a RAKE combined signal based on the channel estimates and the combining statistics.

2. The method of claim 1, wherein determining combining statistics comprising channel coefficient statistics, channel estimation error statistics, and noise statistics for the RAKE fingers comprises estimating correlations of channel coefficients across the RAKE fingers, and determining estimation error and noise correlations across the RAKE fingers.

3. The method of claim 1, wherein determining combining statistics comprising channel coefficient statistics, channel estimation error statistics, and noise statistics for the RAKE fingers comprises estimating means of the channel coefficients for the RAKE fingers, and determining estimation error covariance and noise covariance across the RAKE fingers.

4. The method of claim 3, wherein determining combining statistics further comprises determining channel coefficient covariance across the RAKE fingers.

5. The method of claim 1, wherein generating channel estimates corresponding to the RAKE fingers comprises smoothing despread pilot values.

6. The method of claim 5, wherein determining noise statistics comprises determining noise cross-correlation based on the despread pilot values and scaling the noise cross-correlation based on a smoothing factor to obtain an estimation error cross-correlation as the channel estimation error statistics.

7. The method of claim 1, wherein generating channel estimates corresponding to the RAKE fingers comprises generating channel estimates from a received pilot signal, and wherein determining noise statistics for the RAKE fingers comprises generating a noise cross-correlation matrix from the received pilot signal.

8. The method of claim 1, wherein computing RAKE combining weights for combining the individual finger output signals from the RAKE fingers into a RAKE combined signal based on the channel estimates and the combining statistics comprises:
    scaling a channel coefficient measurement vector based on channel coefficient covariance and estimation error cross-correlation determined for the RAKE fingers;
    adding a term to the scaled channel coefficient measurement vector based on means of the channel coefficients determined for the RAKE fingers; and
    augmenting a noise covariance matrix representing the noise covariance based on the channel coefficient covariance and an estimation error covariance determined for the RAKE fingers.

9. The method of claim 1, wherein computing RAKE combining weights for combining the individual finger output signals from the RAKE fingers into a RAKE combined signal based on the channel estimates and the combining statistics comprises:
    scaling a channel coefficient measurement vector based on channel coefficient cross-correlation and estimation error cross-correlation determined for the RAKE fingers; and
    using the scaled channel coefficient measurement vector and a noise correlation matrix determined for the RAKE fingers to solve for the combining weights.

10. The method of claim 1, wherein determining channel coefficient statistics comprises determining means of the channel coefficients based on smoothing the channel estimates.

11. The method of claim 10, wherein smoothing the channel estimates comprises smoothing values in a channel estimate coefficient vector according to an exponential smoothing filter.

12. The method of claim 1, wherein determining channel coefficient statistics comprises determining channel coefficient statistics across the RAKE fingers such that combining weight generation is compensated for correlations in channel coefficients across the RAKE fingers.

13. The method of claim 12, further comprising determining the channel coefficient statistics based on nominal channel coefficient statistics corresponding to one or more default fading models.

14. The method of claim 1, further comprising receiving signals on two or more receiver antennas.

15. The method of claim 14, wherein determining combining statistics comprises determining noise and estimation error correlations and channel coefficient correlations jointly across the receiver antennas.

16. The method of claim 14, wherein determining combining statistics comprises determining noise and estimation error correlations separately for each receiver antenna and determining channel coefficient correlations jointly across the receiver antennas.

17. The method of claim 14, further comprising assigning a set of RAKE fingers to a received signal from each receiver antenna and determining the combining statistics separately for each set of RAKE fingers.

18. The method of claim 1, further comprising receiving signals from two or more transmit antennas.

19. The method of claim 18, wherein determining combining statistics comprises determining noise and estimation error correlations and channel coefficient correlations jointly across the transmit antennas.

20. The method of claim 18, wherein determining combining statistics comprises determining noise and estimation error correlations separately for each transmit antenna and determining channel coefficient correlations jointly across the transmit antennas.

21. The method of claim 18, further comprising assigning a set of RAKE fingers to a received signal corresponding to each transmit antenna and determining the combining statistics separately for each set of RAKE fingers.

22. The method of claim 1, wherein computing RAKE combining weights for combining the individual finger output signals from the RAKE fingers into a RAKE combined signal based on the channel estimates and the combining statistics comprises selectively computing the combining weights based on the channel estimates and the combining statistics.

23. The method of claim 22, wherein selectively computing the combining weights based on the channel estimates and the combining statistics comprises using the combining statistics to compute the combining weights in a first mode, and using a subset of the combining statistics in a second mode.

24. The method of claim 23, further comprising selecting between the first and second modes based on determining a normalized fading correlation.

25. A RAKE receiver circuit comprising:
a RAKE processor circuit configured to
obtain individual finger output signals by despreading a received signal in each of two or more RAKE fingers;
generate channel estimates corresponding to the RAKE fingers;
determine combining statistics comprising channel coefficient statistics, channel estimation error statistics, and noise statistics for the RAKE fingers; and
compute RAKE combining weights for combining the individual finger output signals from the RAKE fingers into a RAKE combined signal based on the channel estimates and the combining statistics.

26. The circuit of claim 25, wherein the RAKE processor circuit comprises a channel coefficient estimator configured to estimate channel coefficients for the RAKE fingers, a channel coefficient statistic estimator configured to estimate channel coefficient statistics, and a noise and error statistic estimator configured to estimate noise and channel estimation error statistics.

27. The circuit of claim 26, wherein the RAKE processor circuit further comprises a combining weight generator to compute the RAKE combining weights.

28. The circuit of claim 25, wherein the RAKE processor circuit is configured to determine combining statistics comprising channel coefficient statistics, channel estimation error statistics, and noise statistics for the RAKE fingers by estimating correlations of channel coefficients across the RAKE fingers, and determining estimation error and noise correlations across the RAKE fingers.

29. The circuit of claim 25, wherein the RAKE processor circuit is configured to determine combining statistics comprising channel coefficient statistics, channel estimation error statistics, and noise statistics for the RAKE fingers by estimating means of the channel coefficients for the RAKE fingers, and determining estimation error covariance and noise covariance across the RAKE fingers.

30. The circuit of claim 29, wherein the RAKE processor circuit is configured to determine combining statistics further by determining channel coefficient covariance across the RAKE fingers.

31. The circuit of claim 25, wherein the RAKE processor circuit is configured to generate channel estimates corresponding to the RAKE fingers by smoothing despread pilot values.

32. The circuit of claim 31, wherein the RAKE processor circuit is configured to determine noise statistics comprises determining noise cross-correlation based on the despread pilot values and to scale the noise cross-correlation based on a smoothing factor to obtain an estimation error cross-correlation as the channel estimation error statistics.

33. The circuit of claim 25, wherein the RAKE processor circuit is configured to generate channel estimates corresponding to the RAKE fingers by generating channel estimates from a received pilot signal, and wherein the RAKE processor circuit is configured to determine noise statistics for the RAKE fingers by generating a noise cross-correlation matrix from the received pilot signal.

34. The circuit of claim 25, wherein the RAKE processor circuit is configured to compute RAKE combining weights for combining the individual finger output signals from the RAKE fingers into a RAKE combined signal based on the channel estimates and the combining statistics by:

scaling a channel coefficient measurement vector based on channel coefficient covariance and estimation error cross-correlation determined for the RAKE fingers;
adding a term to the scaled channel coefficient measurement vector based on means of the channel coefficients determined for the RAKE fingers; and
augmenting a noise covariance matrix representing the noise covariance based on the channel coefficient covariance and an estimation error covariance determined for the RAKE fingers.

35. The circuit of claim 25, wherein the RAKE processor circuit is configured to compute RAKE combining weights for combining the individual finger output signals from the RAKE fingers into a RAKE combined signal based on the channel estimates and the combining statistics by:
scaling a channel coefficient measurement vector based on channel coefficient and estimation error cross-correlation determined for the RAKE fingers; and
using the scaled channel coefficient measurement vector and a noise correlation matrix determined for the RAKE fingers to solve for the combining weights.

36. The circuit of claim 25, wherein the RAKE processor circuit is configured to determine channel coefficient statistics by determining means of the channel coefficients based on smoothing the channel estimates.

37. The circuit of claim 36, wherein the RAKE processor circuit is configured to smooth the channel estimates by smoothing values in a channel estimate coefficient vector according to an exponential smoothing filter.

38. The circuit of claim 25, wherein the RAKE processor circuit is configured to determine channel coefficient statistics by determining channel coefficient statistics across the RAKE fingers such that combining weight generation is compensated for correlations in channel coefficients across the RAKE fingers.

39. The circuit of claim 38, wherein the RAKE processor circuit is configured to determine the channel coefficient statistics based on nominal channel coefficient statistics corresponding to one or more default fading models.

40. The circuit of claim 39, further comprising a memory circuit to store data corresponding to the one or more default fading models.

41. The circuit of claim 25, wherein the RAKE processor circuit is configured to process signals from two or more receiver antennas.

42. The circuit of claim 41, wherein the RAKE processor circuit is configured to determine combining statistics by determining noise and estimation error correlations and channel coefficient correlations jointly across the receiver antennas.

43. The circuit of claim 41, wherein the RAKE processor circuit is configured to determine combining statistics by determining noise and estimation error correlations separately for each receiver antenna and to determine channel coefficient correlations jointly across the receiver antennas.

44. The circuit of claim 41, wherein the RAKE processor circuit is configured to assign a set of RAKE fingers to a received signal from each receiver antenna and determine the combining statistics separately for each set of RAKE fingers.

45. The circuit of claim 25, wherein the received signal comprises signals received from two or more transmit antennas.

46. The circuit of claim 45, wherein the RAKE processor circuit is configured to determine the combining statistics by determining noise and estimation error correlations and channel coefficient correlations jointly across the signals from the two or more transmit antennas.

47. The circuit of claim 45, wherein the RAKE processor circuit is configured to determine the combining statistics by determining noise and estimation error correlations separately for each transmit antenna and determining channel coefficient correlations jointly across the signals from the two or more transmit antennas.

48. The circuit of claim 45, wherein the RAKE processor circuit is configured to assign a set of RAKE fingers to a received signal corresponding to each transmit antenna and determining the combining statistics separately for each set of RAKE fingers.

49. The circuit of claim 25, wherein the RAKE processor circuit is configured to compute RAKE combining weights for combining the individual finger output signals from the RAKE fingers into a RAKE combined signal based on the channel estimates and the combining statistics by selectively computing the combining weights based on the channel estimates and the combining statistics.

50. The circuit of claim 49, wherein the RAKE processor circuit is configured to selectively compute the combining weights based on the channel estimates and the combining statistics comprises by using the combining statistics to compute the combining weights in a first mode, and using a subset of the combining statistics in a second mode.

51. The method of claim 50, wherein the RAKE processor circuit is configured to select between the first and second modes based on determining a normalized fading correlation.

52. A computer readable medium storing a computer program comprising:
program instructions to obtain individual finger output signals by despreading a received signal in each of two or more RAKE fingers;
program instructions to generate channel estimates corresponding to the RAKE fingers;
program instructions to determine combining statistics comprising channel coefficient statistics, channel estimation error statistics, and noise statistics for the RAKE fingers; and
program instructions to compute RAKE combining weights for combining the individual finger output signals from the RAKE fingers into a RAKE combined signal based on the channel estimates and the combining statistics.

53. The computer readable medium of claim 52, wherein the program instructions to generate channel estimates corresponding to the RAKE fingers comprise program instructions to generate a channel estimate vector based on smoothing despread pilot values.

54. The computer readable medium of claim 53, wherein the program instructions to determine noise statistics comprise program instructions to determine noise cross-correlations for the RAKE fingers, and wherein the program instructions to determine channel estimation error statistics comprise program instructions to determine channel estimation error cross-correlations by scaling the noise cross-correlation matrix according to a smoothing factor associated with generating the channel estimate vector.

55. A mobile terminal comprising:
a transmitter to transmit wireless signals to one or more remote receivers;
a receiver to receive wireless signals from one or more remote transmitters, said receiver comprising a RAKE receiver circuit configured to:
obtain individual finger output signals by despreading a received signal in each of two or more RAKE fingers;
generate channel estimates corresponding to the RAKE fingers;
determine combining statistics comprising channel coefficient statistics, channel estimation error statistics, and noise statistics for the RAKE fingers; and
compute RAKE combining weights for combining the individual finger output signals from the RAKE fingers into a RAKE combined signal based on the channel estimates and the combining statistics.

56. The mobile terminal of claim 55, wherein the RAKE receiver circuit comprises a channel coefficient estimator configured to estimate channel coefficients for the RAKE fingers, a channel coefficient statistics estimator configured to estimate channel coefficient statistics for the RAKE fingers, and a noise and error statistics estimator configured to estimate noise statistics and channel estimation error statistics for the RAKE fingers.

57. The mobile terminal of claim 56, wherein the channel coefficient statistics estimator is configured to estimate cross-correlations in channel coefficients for two or more of the RAKE fingers.

58. The mobile terminal of claim 56, wherein the channel coefficient statistics estimator is configured to estimate means of channel coefficients for each of two or more of the RAKE fingers.

59. The mobile terminal of claim 56, wherein the noise and error statistics estimator is configured to estimate noise cross-correlations and channel estimation error cross-correlations across two or more of the RAKE fingers.

60. The mobile terminal of claim 55, wherein the RAKE receiver circuit further comprises a combining weight generator to compute the RAKE combining weights.

61. The mobile terminal of claim 55, wherein the RAKE receiver circuit is configured to generate channel estimates, determine combining statistics and compute combining weights jointly for one or more received diversity signals.

62. The mobile terminal of claim 55, wherein the RAKE receiver circuit is configured to generate channel estimates, determine combining statistics and compute combining weights for one or more received diversity signals according to a mixed joint/separate processing wherein channel coefficient cross-correlations are computed jointly across the diversity signals and noise and channel estimation error cross-correlations are computed separately on a per diversity signal basis.

63. The mobile terminal of claim 55, wherein the RAKE receiver circuit is configured to determine combining statistics comprising channel coefficient statistics, channel estimation error statistics, and noise statistics for the RAKE fingers by estimating means of the channel coefficients for the RAKE fingers, and determining estimation error covariance and noise covariance across the RAKE fingers.

64. The mobile terminal of claim 63, wherein the RAKE receiver circuit is configured to determine combining statistics further by determining channel coefficient covariance across the RAKE fingers.

65. The mobile terminal of claim 55, wherein the RAKE receiver circuit is configured to generate channel estimates corresponding to the RAKE fingers by smoothing despread pilot values.

66. The mobile terminal of claim 65, wherein the RAKE receiver circuit is configured to determine noise statistics comprises determining noise cross-correlation based on the despread pilot values and to scale the noise cross-correlation based on a smoothing factor to obtain an estimation error cross-correlation as the channel estimation error statistics.

67. The mobile terminal of claim 55, wherein the RAKE receiver circuit is configured to generate channel estimates corresponding to the RAKE fingers by generating channel estimates from a received pilot signal, and wherein the RAKE receiver mobile terminal is configured to determine noise statistics for the RAKE fingers by generating a noise cross-correlation matrix from the received pilot signal.

68. The mobile terminal of claim 55, wherein the RAKE receiver circuit is configured to compute RAKE combining weights for combining the individual finger output signals from the RAKE fingers into a RAKE combined signal based on the channel estimates and the combining statistics by:
   scaling a channel coefficient measurement vector based on channel coefficient covariance and estimation error cross-correlation determined for the RAKE fingers;
   adding a term to the scaled channel coefficient measurement vector based on means of the channel coefficients determined for the RAKE fingers; and
   augmenting a noise covariance matrix representing the noise covariance based on the channel coefficient covariance and an estimation error covariance determined for the RAKE fingers.

69. The mobile terminal of claim 55, wherein the RAKE receiver circuit is configured to compute RAKE combining weights for combining the individual finger output signals from the RAKE fingers into a RAKE combined signal based on the channel estimates and the combining statistics by:
   scaling a channel coefficient measurement vector based on channel coefficient and estimation error cross-correlation determined for the RAKE fingers; and
   using the scaled channel coefficient measurement vector and a noise correlation matrix determined for the RAKE fingers to solve for the combining weights.

70. The mobile terminal of claim 55, wherein the RAKE receiver circuit is configured to determine channel coefficient statistics by determining means of the channel coefficients based on smoothing the channel estimates.

71. The mobile terminal of claim 70, wherein the RAKE receiver circuit is configured to smooth the channel estimates by smoothing values in a channel estimate coefficient vector according to an exponential smoothing filter.

72. The mobile terminal of claim 55, wherein the RAKE receiver circuit is configured to determine channel coefficient statistics by determining channel coefficient statistics across the RAKE fingers such that combining weight generation is compensated for correlations in channel coefficients across the RAKE fingers.

73. The mobile terminal of claim 72, wherein the RAKE receiver circuit is configured to determine the channel coefficient statistics based on nominal channel coefficient statistics corresponding to one or more default fading models.

74. The mobile terminal of claim 73, further comprising a memory circuit to store data corresponding to the one or more default fading models.

75. The mobile terminal of claim 55, wherein the RAKE receiver circuit is configured to process signals from two or more receiver antennas.

76. The mobile terminal of claim 75, wherein the RAKE receiver circuit is configured to determine combining statistics by determining noise and estimation error correlations and channel coefficient correlations jointly across the receiver antennas.

77. The mobile terminal of claim 75, wherein the RAKE receiver circuit is configured to determine combining statistics by determining noise and estimation error correlations separately for each receiver antenna and to determine channel coefficient correlations jointly across the receiver antennas.

78. The mobile terminal of claim 75, wherein the RAKE receiver circuit is configured to assign a set of RAKE fingers to a received signal from each receiver antenna and determine the combining statistics separately for each set of RAKE fingers.

79. The mobile terminal of claim 55, wherein the received signal comprises signals received from two or more transmit antennas.

80. The mobile terminal of claim 79, wherein the RAKE receiver mobile terminal is configured to determine the combining statistics by determining noise and estimation error correlations and channel coefficient correlations jointly across the signals from the two or more transmit antennas.

81. The mobile terminal of claim 79, wherein the RAKE receiver circuit is configured to determine the combining statistics by determining noise and estimation error correlations separately for each transmit antenna and determining channel coefficient correlations jointly across the signals from the two or more transmit antennas.

82. The mobile terminal of claim 79, wherein the RAKE receiver circuit is configured to assign a set of RAKE fingers to a received signal corresponding to each transmit antenna and determine the combining statistics separately for each set of RAKE fingers.

83. A base station for use in a wireless communication network comprising:
   a transmitter to transmit wireless signals to one or more remote receivers;
   a receiver to receive wireless signals from one or more remote transmitters, said receiver comprising a RAKE receiver circuit configured to:
      obtain individual finger output signals by despreading a received signal in each of two or more RAKE fingers;
      generate channel estimates corresponding to the RAKE fingers;
      determine combining statistics comprising channel coefficient statistics, channel estimation error statistics, and noise statistics for the RAKE fingers; and
      compute RAKE combining weights for combining the individual finger output signals from the RAKE fingers into a RAKE combined signal based on the channel estimates and the combining statistics.

84. The base station of claim 83, wherein the RAKE receiver circuit comprises a channel coefficient estimator configured to estimate channel coefficients for the RAKE fingers, a channel coefficient statistic estimator configured to estimate channel coefficient statistics, and a noise and error statistic estimator configured to estimate noise and channel estimation error statistics.

85. The base station of claim 84, wherein the RAKE receiver circuit further comprises a combining weight generator to compute the RAKE combining weights.

86. The base station of claim 83, wherein the RAKE receiver circuit is configured to determine combining statistics comprising channel coefficient statistics, channel estimation error statistics, and noise statistics for the RAKE fingers by estimating correlations of channel coefficients across the RAKE fingers, and determining estimation error and noise correlations across the RAKE fingers.

87. The base station of claim 83, wherein the RAKE receiver circuit is configured to determine combining statistics comprising channel coefficient statistics, channel estimation error statistics, and noise statistics for the RAKE fingers by estimating means of the channel coefficients for the RAKE fingers, and determining estimation error covariance and noise covariance across the RAKE fingers.

88. The base station of claim 87, wherein the RAKE receiver circuit is configured to determine combining statistics further by determining channel coefficient covariance across the RAKE fingers.

89. The base station of claim 83, wherein the RAKE receiver circuit is configured to generate channel estimates corresponding to the RAKE fingers by smoothing despread pilot values.

90. The base station of claim 89, wherein the RAKE receiver circuit is configured to determine noise statistics comprises determining noise cross-correlation based on the despread pilot values and to scale the noise cross-correlation based on a smoothing factor to obtain an estimation error cross-correlation as the channel estimation error statistics.

91. The base station of claim 83, wherein the RAKE receiver circuit is configured to generate channel estimates corresponding to the RAKE fingers by generating channel estimates from a received pilot signal, and wherein the RAKE receiver mobile terminal is configured to determine noise statistics for the RAKE fingers by generating a noise cross-correlation matrix from the received pilot signal.

* * * * *